US012628134B2

(12) United States Patent
Selvanesan et al.

(10) Patent No.: US 12,628,134 B2
(45) Date of Patent: May 12, 2026

(54) RESOURCE RESERVATION PREDICTION FOR SIDELINE UEs

(71) Applicant: KONINKLIJKE PHILIPS N.V., Eindhoven (NL)

(72) Inventors: Sarun Selvanesan, Berlin (DE); Baris Göktepe, Berlin (DE); Thomas Fehrenbach, Berlin (DE); Thomas Schierl, Berlin (DE); Cornelius Hellge, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 577 days.

(21) Appl. No.: 18/013,290

(22) PCT Filed: Jun. 30, 2021

(86) PCT No.: PCT/EP2021/068016
§ 371 (c)(1),
(2) Date: Dec. 28, 2022

(87) PCT Pub. No.: WO2022/003031
PCT Pub. Date: Jan. 6, 2022

(65) Prior Publication Data
US 2023/0247596 A1      Aug. 3, 2023

(30) Foreign Application Priority Data
Jul. 1, 2020     (EP) .................................... 20183530

(51) Int. Cl.
*H04W 72/0446* (2023.01)
*H04W 72/40* (2023.01)
*H04W 74/0808* (2024.01)

(52) U.S. Cl.
CPC ....... *H04W 72/0446* (2013.01); *H04W 72/40* (2023.01); *H04W 74/0808* (2013.01)

(58) Field of Classification Search
None
See application file for complete search history.

(56) References Cited

U.S. PATENT DOCUMENTS

2020/0029245 A1    1/2020  Khoryaev et al.
2020/0029340 A1*   1/2020  He ......................... H04W 72/25
2022/0060929 A1*   2/2022  Hassan ............. H04W 28/0284
(Continued)

FOREIGN PATENT DOCUMENTS

WO      2020033088 A1    2/2020
WO      2020033226 A1    2/2020
WO      2020064806 A1    4/2020

OTHER PUBLICATIONS

International Search Report and Written Opinion fromPCT/EP2021/068106 mailed Jan. 6, 2022.
(Continued)

*Primary Examiner* — Diane L Lo

(57) ABSTRACT

A user device, UE, for a wireless communication network is described. The wireless communication network provides a set of resources for a communication, and the UE carries out sensing on one or more subsets of time resources of the set of resources. A number of time resources of the one or more subsets is less than the total number of resources within the set of resources provided by the network.

33 Claims, 22 Drawing Sheets

(56)  References Cited

U.S. PATENT DOCUMENTS

2023/0084593 A1 * 3/2023 Hoang ............. H04W 52/0225
370/311

OTHER PUBLICATIONS

ZTE et al: "Mode 2 Resource allocation schemes on sidelink",
3GPP Draft; R1-1905342 Mode 2 Resource Allocation Schemes on
Sidelink, 3rd Generation Partnership Projeci (3GPP), Mobile Com-
petence Centre ; 650, Route Des Lucioles ; F-06921 Sophia-
Antipolis Cedex ; vol. RAN WG1, No. Xi'an, China; Apr. 8,
2019-Apr. 12, 2019 Apr. 2, 2019 (Apr. 2, 2019), XP051707417.
ZTE et al: "Analysis of Mode 2 resource schemes on sidelink",
3GPP Draft; R1-1901880 Analysis of Mode 2 Resource Schemes on
Sidelink, 3RD Generation Partnership Projeci (3GPP), Mobile
Competence Centre ; 650, Route Des Lucioles ; F-06921 Sophia-
Antipolis Cedex ; vol. RAN WG1, No. Athens, Greece; Feb. 25,
2019-Mar. 1, 2019 Feb. 15, 2019 (Feb. 15, 2019), XP05159957 4.

* cited by examiner

100

102 core network external networks backhaul 114

RAN₁

RAN₂

RANₙ

108₁  108₂

UE₁

UE₂ gNBs ← → core

116₂  gNB₂  114₂

106₂

112₂  108₃  112₁

110₁

IoT  UE₃  IoT gNBs ← → core

116₄  gNB₄  114₄

106₄

ANT gNBs ← →

116₁  gNB₁  114₁

106₁

110₂ gNBs ← →

116₅  gNB₅  114₅

106₅ gNBs ← →

116₃  gNB₃  114₃

106₃

RANn window size: 17; detection rate: 0.7908045977011494 window size: 20; detection rate: 0.8735632183908046

Tx Min distance: 9; window size: 17;
detection rate: 0.848484848484848485

Fig. 15

RESOURCE RESERVATION PREDICTION FOR SIDELINE UEs

CROSS-REFERENCE TO PRIOR APPLICATIONS

This application is the U.S. National Phase application under 35 U.S.C. § 371 of International Application No. PCT/EP2021/068016, filed on Jun. 30, 2021, which claims the benefit of EP Patent Application No. EP 20183530.3, filed on Jul. 1, 2020. These applications are hereby incorporated by reference herein.

The present invention relates to the field of wireless communication systems or networks, more specifically, to the field of vehicle-to-vehicle, V2X, communications within such a wireless communication system or network. Embodiments relate to the operation of user devices, UEs, carrying out sensing, like UEs operating in Mode 1 so as to carry out sensing, e.g. to generate a sensing report, or in Mode 2 so as to autonomously carry out resource selection and allocation by sensing.

FIG. 1 is a schematic representation of an example of a terrestrial wireless network $100$ including, as is shown in FIG. 1($a$), the core network $102$ and one or more radio access networks $RAN_1$, $RAN_2$, . . . $RAN_N$. FIG. 1($b$) is a schematic representation of an example of a radio access network RAN, that may include one or more base stations $gNB_1$ to $gNB_5$, each serving a specific area surrounding the base station schematically represented by respective cells $106_1$ to $106_6$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1($b$) shows an exemplary view of five cells, however, the $RAN_n$ may include more or less such cells, and RAN, may also include only one base station. FIG. 1($b$) shows two users $UE_1$ and $UE_2$, also referred to as user equipment, UE, that are in cell $106_2$ and that are served by base station $gNB_2$. Another user UEs is shown in cell $106_4$ which is served by base station $gNB_4$. The arrows $108_1$, $108_2$ and $108_3$ schematically represent uplink/downlink connections for transmitting data from a user $UE_1$, $UE_2$ and UEs to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1($b$) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network $102$, e.g. via the S1 interface, via respective backhaul links $114_1$ to $114_5$, which are schematically represented in FIG. 1($b$) by the arrows pointing to "core". The core network $102$ may be connected to one or more external networks. The external network may be the Internet, or a private network, such as an Intranet or any other type of campus networks, e.g. a private WiFi or 4G or 5G mobile communication system. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1($b$) by the arrows pointing to "$gNB_5$". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, POSCH, PUSCH, PSSCH, carrying user specific data, also referred to as downlink, uplink and sidelink payload data, the physical broadcast channel, PBCH, carrying for example a master information block, MIB, and one or more of a system information block, SIB, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix, CP, length. A frame may also consist of a smaller number of OFDM symbols, e.g. when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs may have functionalities of BS or of UEs, depending on the specific network configuration. Other UEs may not be vehicular related UEs and may comprise any of the above-mentioned devices. Such devices may also communicate directly with each other, D2D communication, using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs may not be connected to a base station, for example, they are not in an RRC connected state, so that the UEs do not receive from the base station any sidelink resource allocation configuration or assistance, and/or may be connected to the base station, but, for one or more reasons, the base station may not provide sidelink resource allocation configuration or assistance for the UEs, and/or may be connected to the base station that may not support NR V2X services, e.g., GSM, UMTS, LTE base stations.

When considering two UEs directly communicating with each other over the sidelink, e.g., using the PC5/PC3 interface, one of the UEs may also be connected with a BS, and may relay information from the BS to the other UE via the sidelink interface and vice-versa. The relaying may be performed in the same frequency band, in-band-relay, or another frequency band, out-of-band relay, may be used. In the first case, communication on the Uu and on the sidelink may be decoupled using different time slots as in time division duplex, TDD, systems.

FIG. 2(a) is a schematic representation of an in-coverage scenario in which two UEs directly communicating with each other are both connected to a base station. The base station gNB has a coverage area that is schematically represented by the circle 150 which, basically, corresponds to the cell schematically represented in FIG. 1. The UEs directly communicating with each other include a first vehicle 152 and a second vehicle 154 both in the coverage area 150 of the base station gNB. Both vehicles 152, 154 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a Mode 1 configuration in NR V2X or as a Mode 3 configuration in LTE V2X.

FIG. 2(b) is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 156, 158 and 160 are shown directly communicating with each other over a sidelink, e.g., using the PC5 interface. The scheduling and/or interference management of the V2V traffic is based on algorithms implemented between the vehicles. This configuration is also referred to as a Mode 2 configuration in NR V2X or as a Mode 4 configuration in LTE V2X. As mentioned above, the scenario in FIG. 2(b) which Is the out-of-coverage scenario does not necessarily mean that the respective Mode 2 UEs in NR or mode 4 UEs in LTE are outside of the coverage 150 of a base station, rather, it means that the respective Mode 2 UEs in NR or mode 4 UEs in LTE are not served by a base station, are not connected to the base station of the coverage area, or are connected to the base station but receive no SL resource allocation configuration or assistance from the base station. Thus, there may be situations in which, within the coverage area 150 shown in FIG. 2(a), in addition to the NR Mode 1 or LTE Mode 3 UEs 152, 154 also NR Mode 2 or LTE mode 4 UEs 156, 158, 160 are present. In addition, FIG. 2(b), schematically illustrates an out of coverage UE using a relay to communicate with the network. For example, the UE 160 may communicate over the sidelink with $UE_1$ which, in turn, may be connected to the gNB via the Uu interface. Thus, $UE_1$ may relay information between the gNB and the UE 160

Although FIG. 2(a) and FIG. 2(b) illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

It is noted that the information in the above section is only for enhancing the understanding of the background of the invention and, therefore, it may contain information that does not form prior art that is already known to a person of ordinary skill in the art.

Starting from the above, there may be a need for improvements or enhancements for user devices carrying out sensing.

Embodiments of the present invention are now described in further detail with reference to the accompanying drawings:

FIG. 1 is a schematic representation of an example of a terrestrial wireless network, wherein FIG. 1(a) illustrates a core network and one or more radio access networks, and FIG. 1(*b*) is a schematic representation of an example of a radio access network RAN;

FIG. 2 schematic represents in-coverage and out-of-coverage scenarios, wherein FIG. 2(*a*) is a schematic representation of an in-coverage scenario in which two UEs directly communicating with each other are both connected to a base station, and FIG. 2(*b*) is a schematic representation of an out-of-coverage scenario in which the UEs directly communicating with each other, FIG. 3 illustrates a reservation window and the values t1 and t2 derived from a TRIV value, which are indicated in an SCI received at a UE;

FIG. 5(*b*) illustrates various embodiments of the inventive approach using one or more subsets or SSWs of the same or different duration;

Figure 7A:
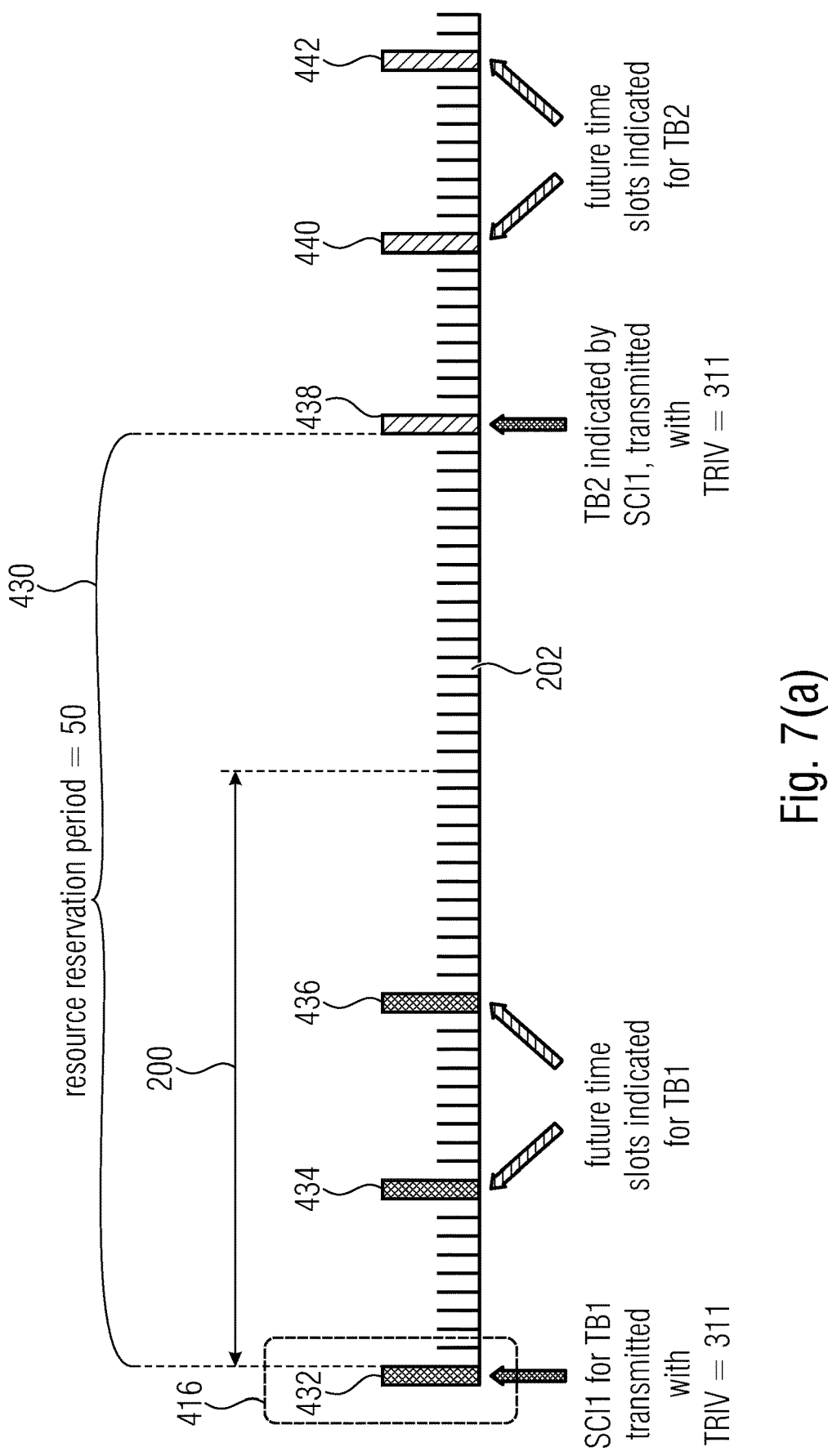
Figure 7B:
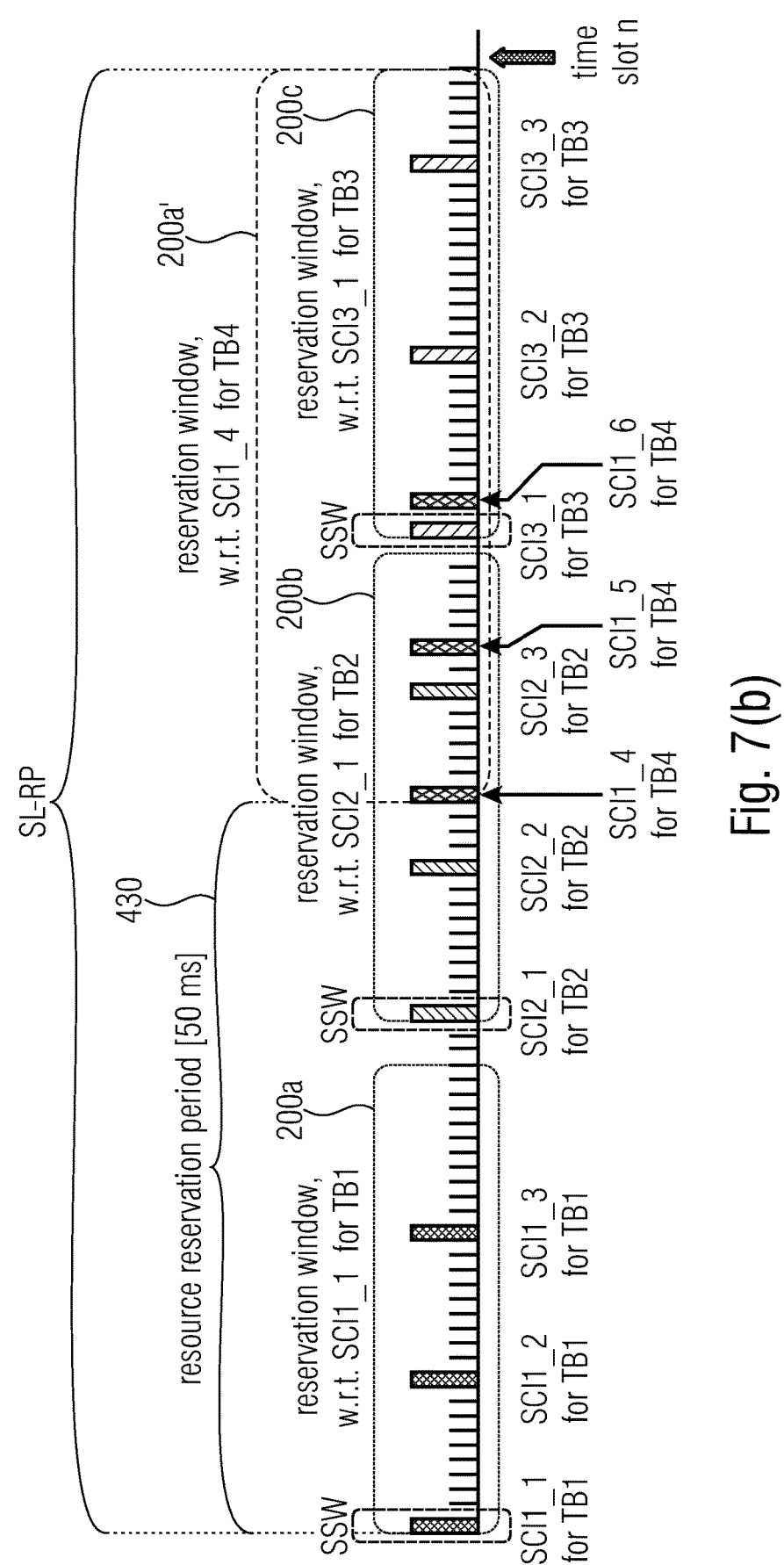
Figure 8:
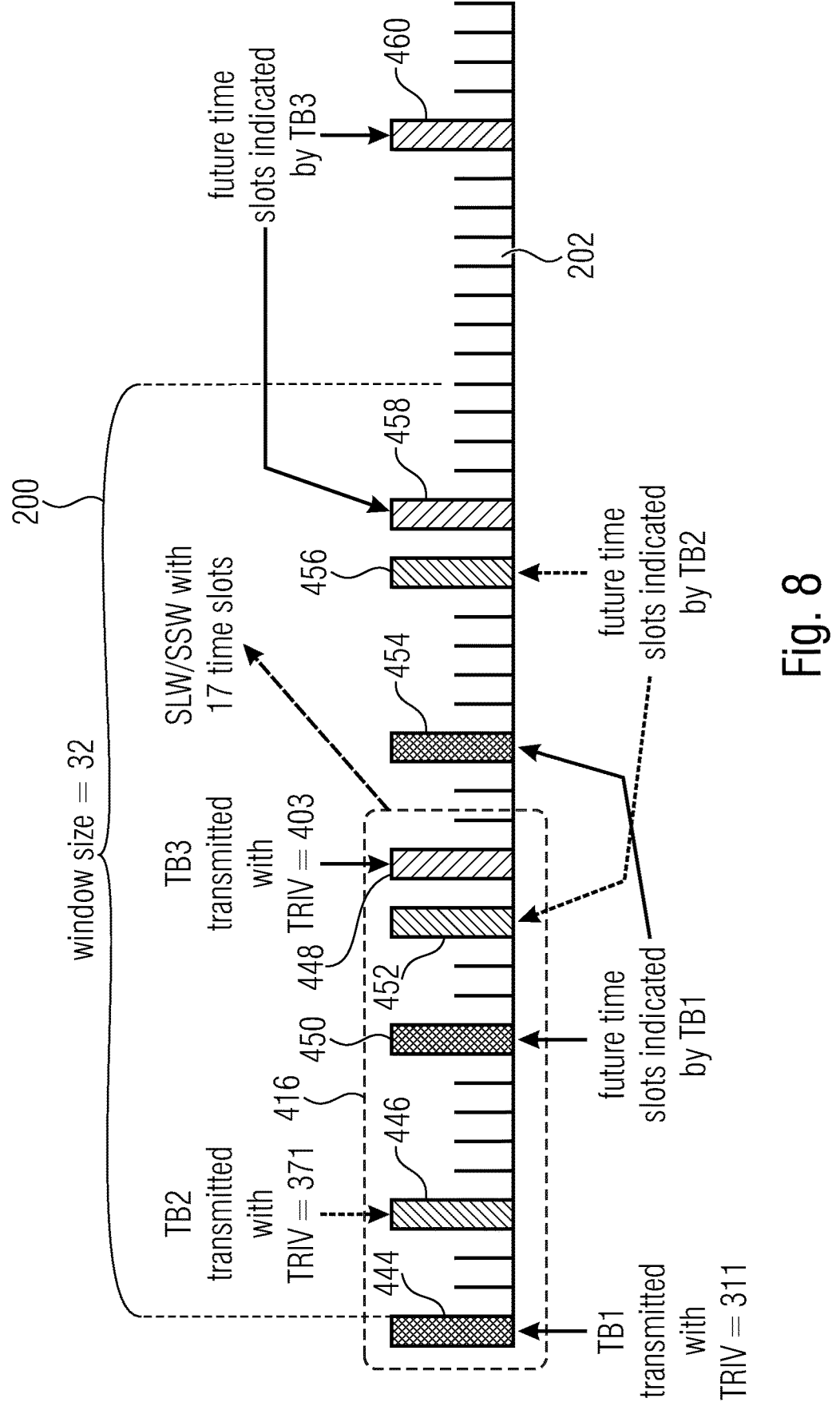
Figure 9:
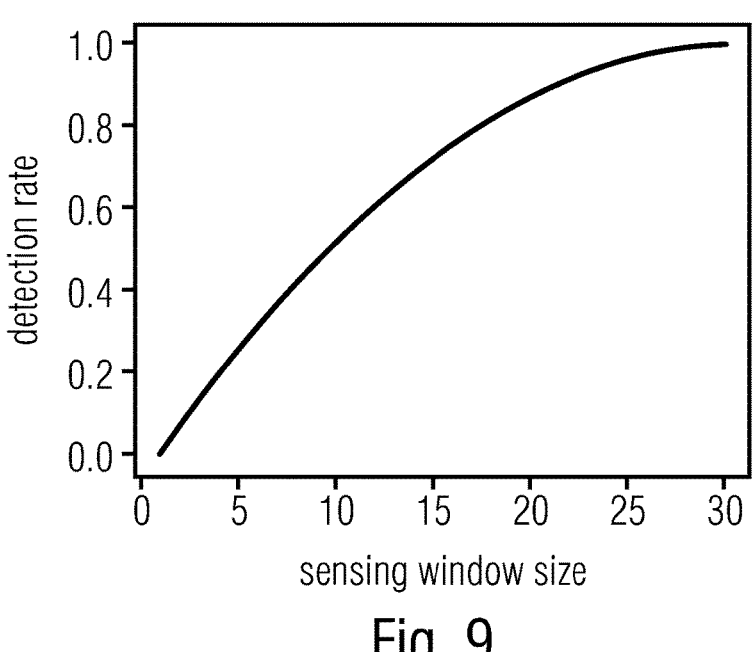
Figure 10:
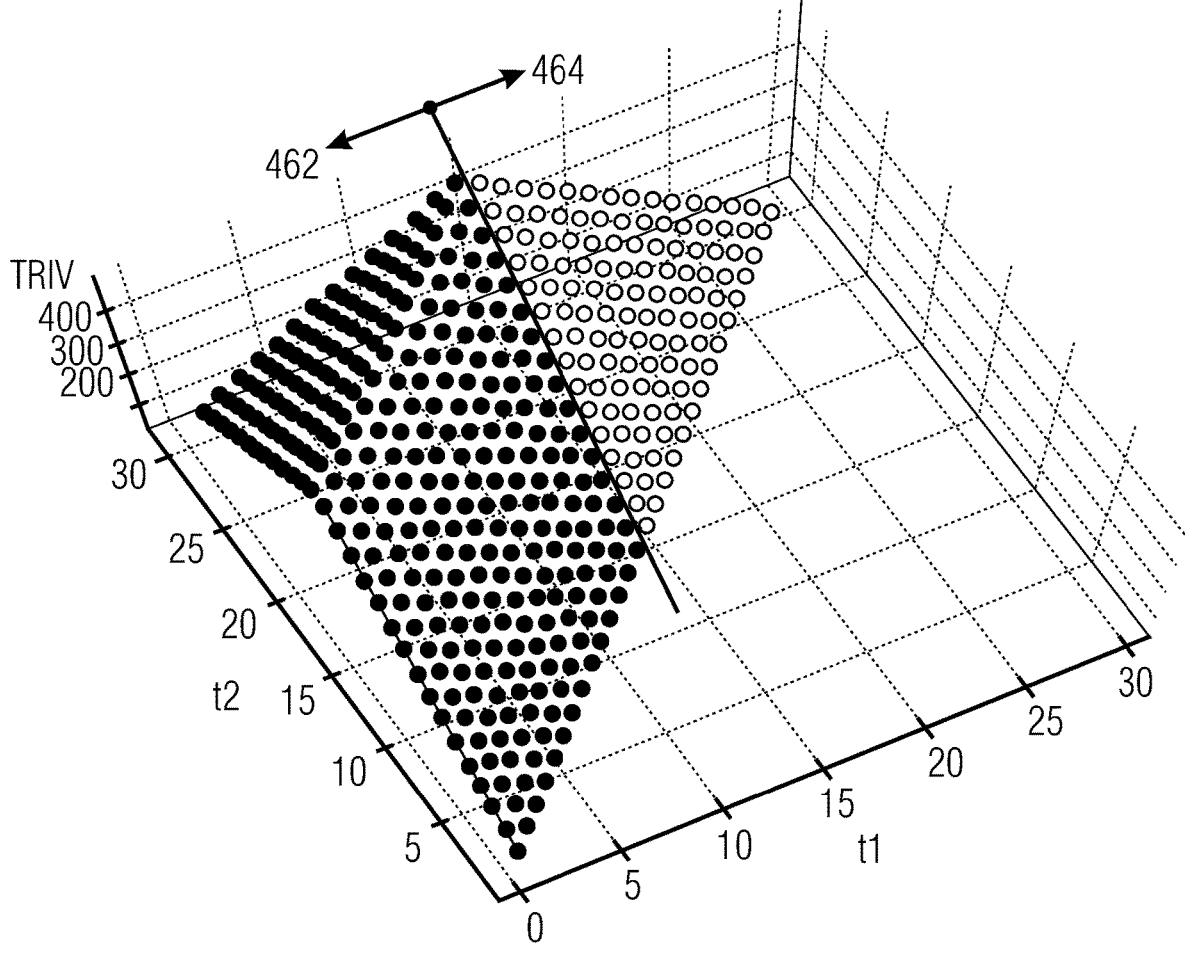
Figure 11:
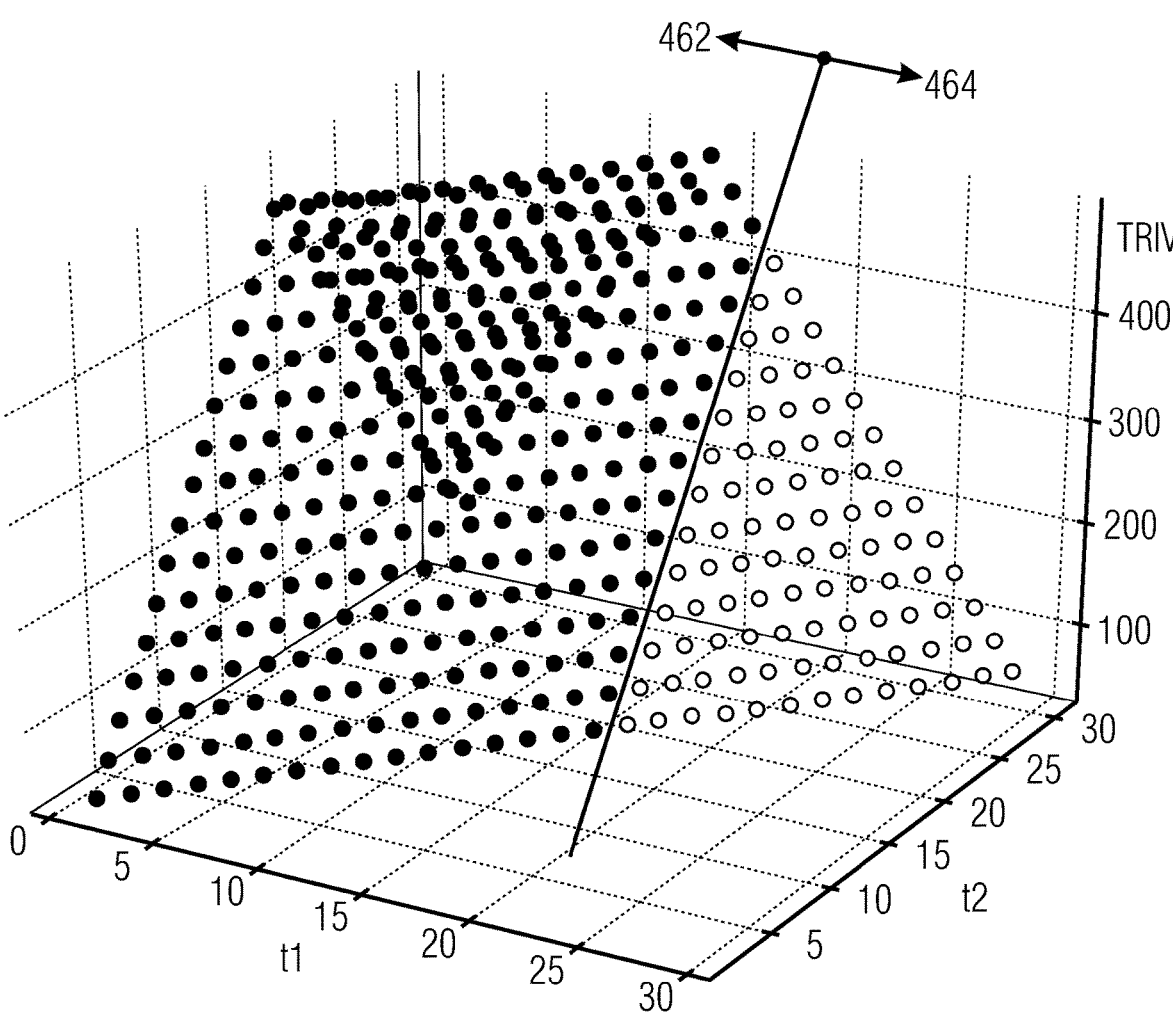
Figure 12:
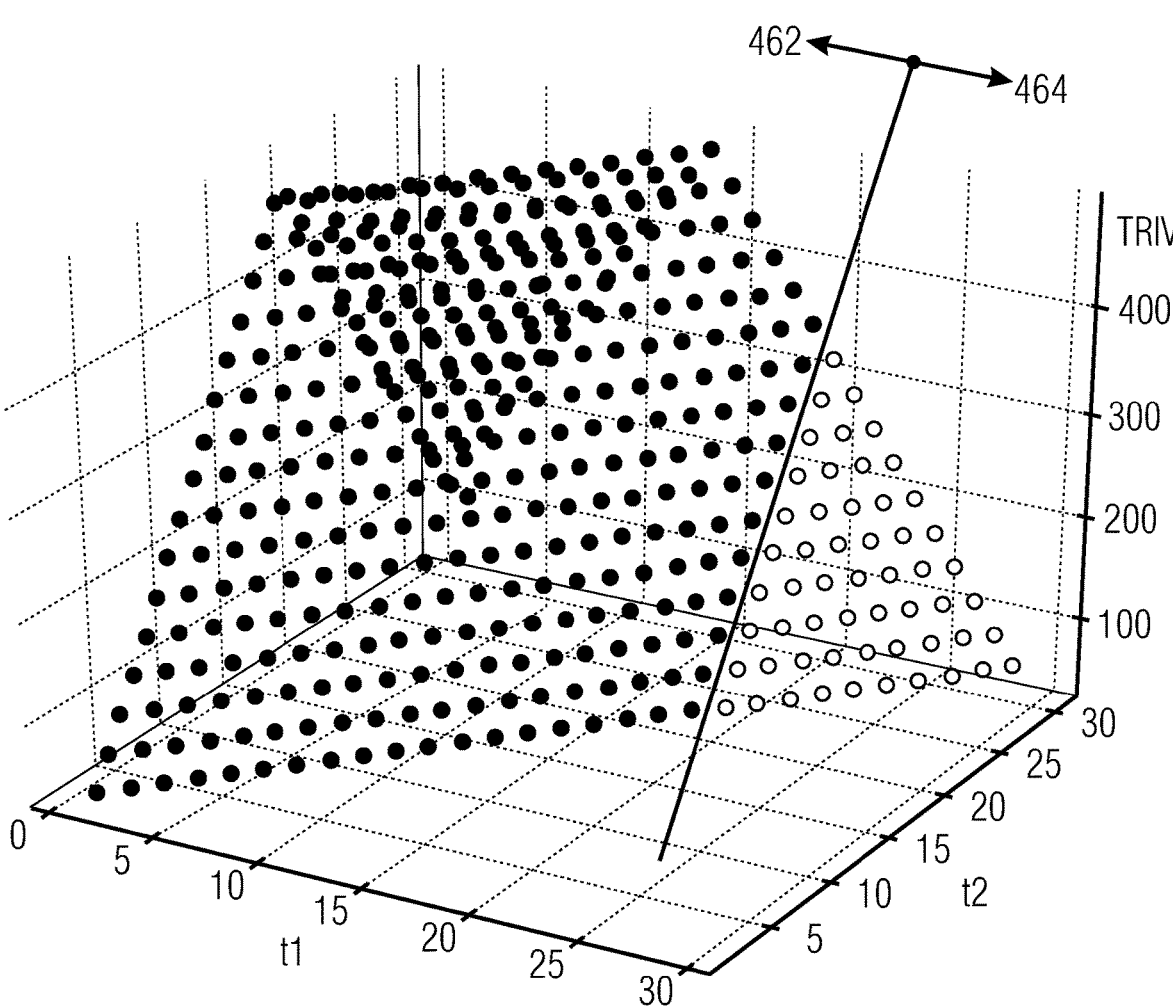
Figure 13:
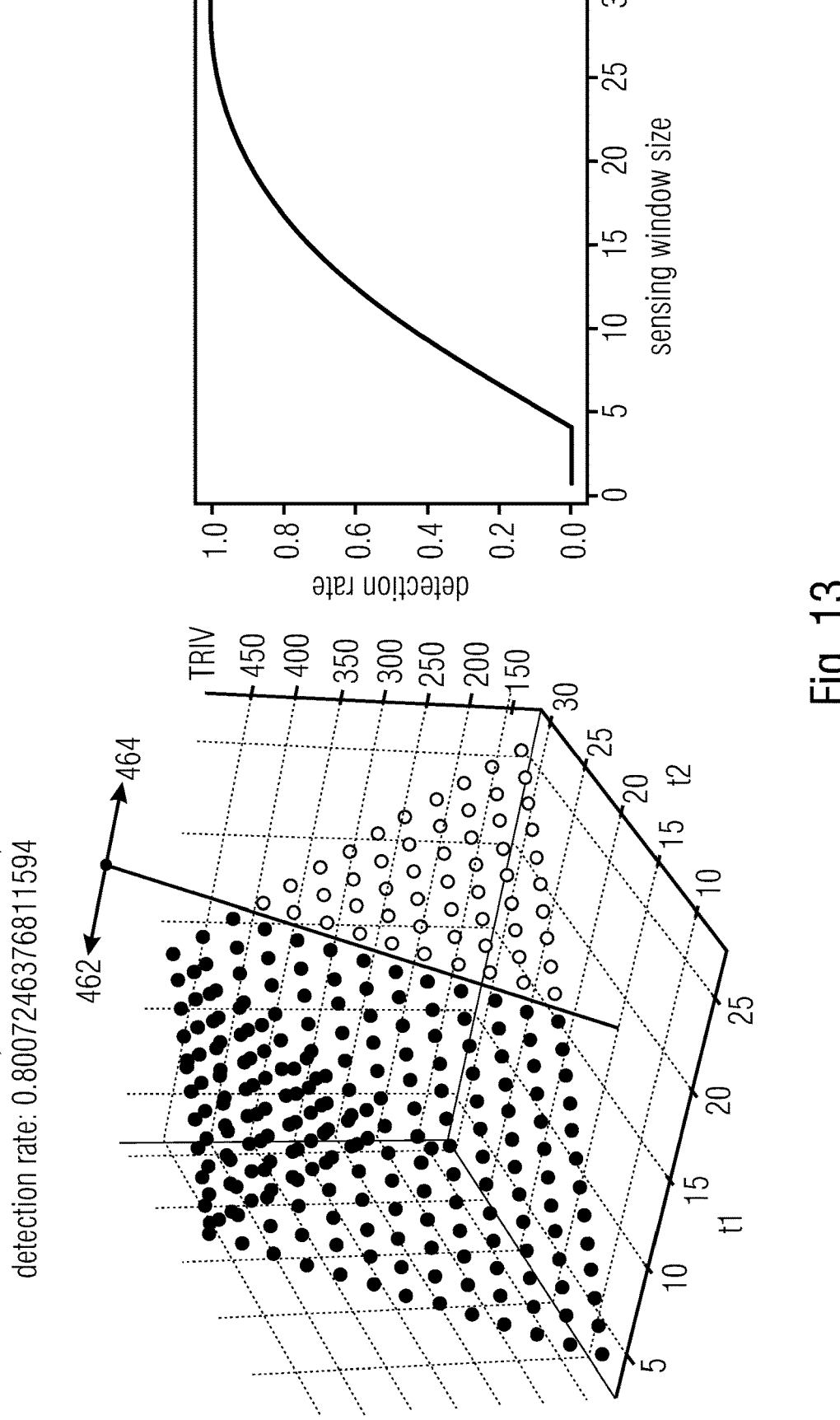
Figure 14:
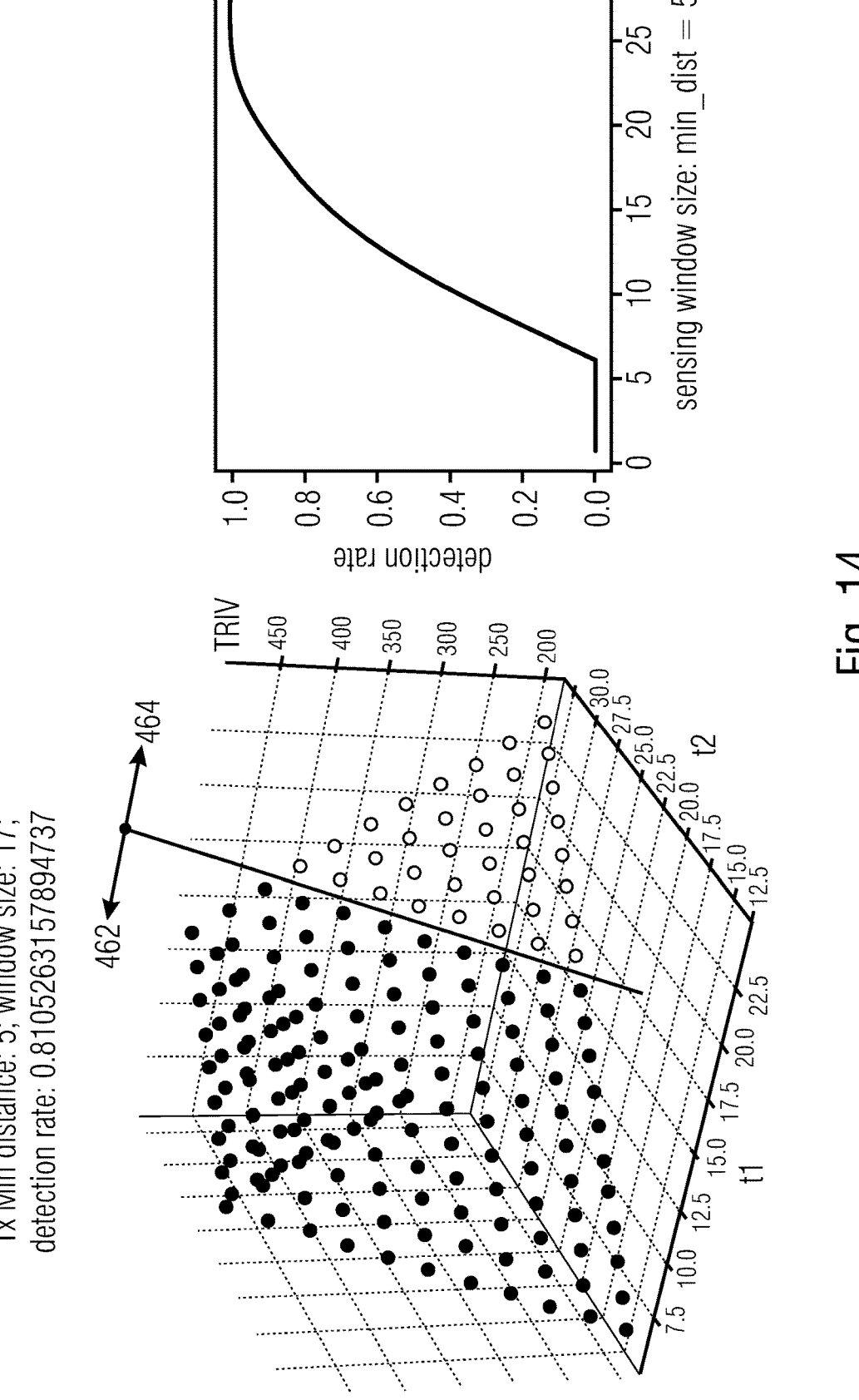
Figure 16:
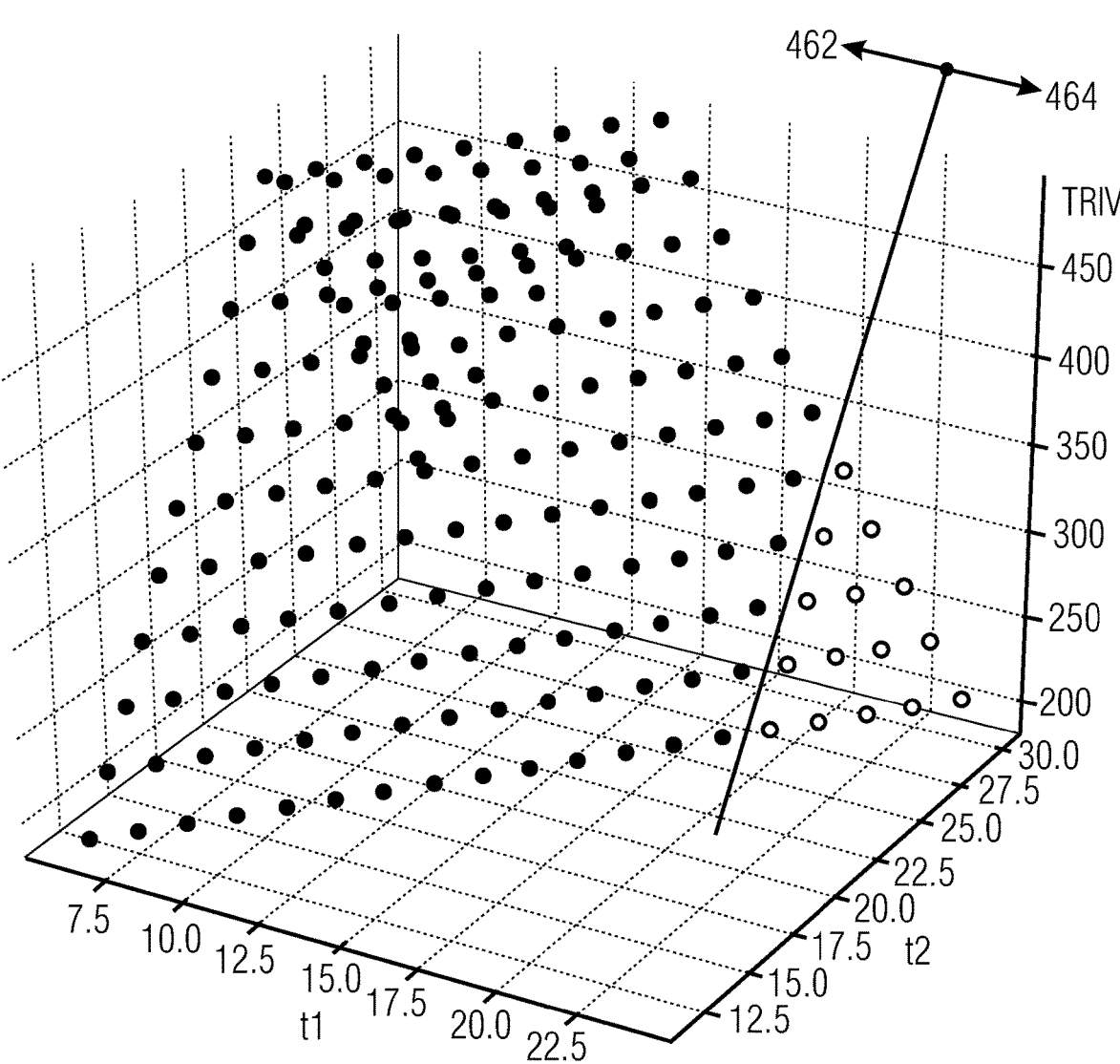
Figure 17:
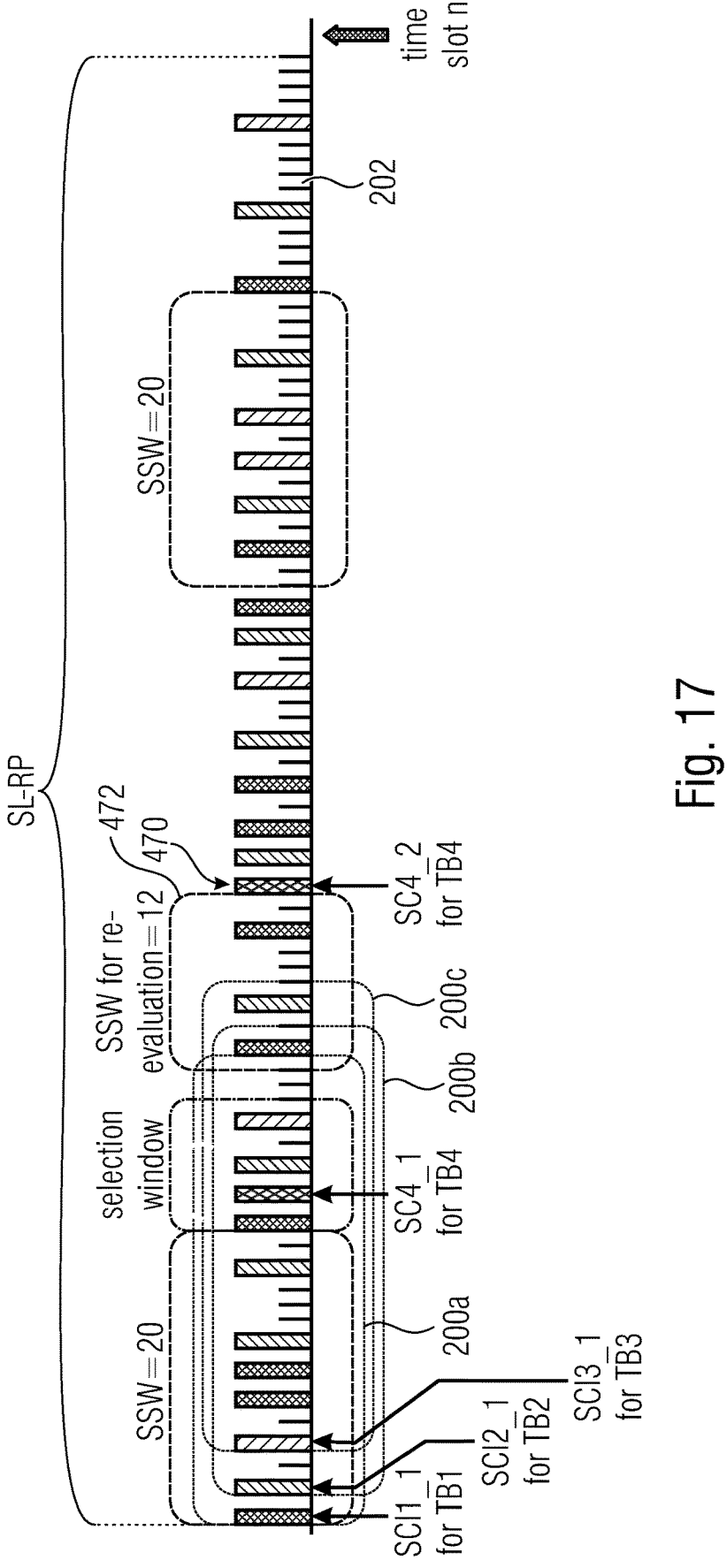
Figure 18:
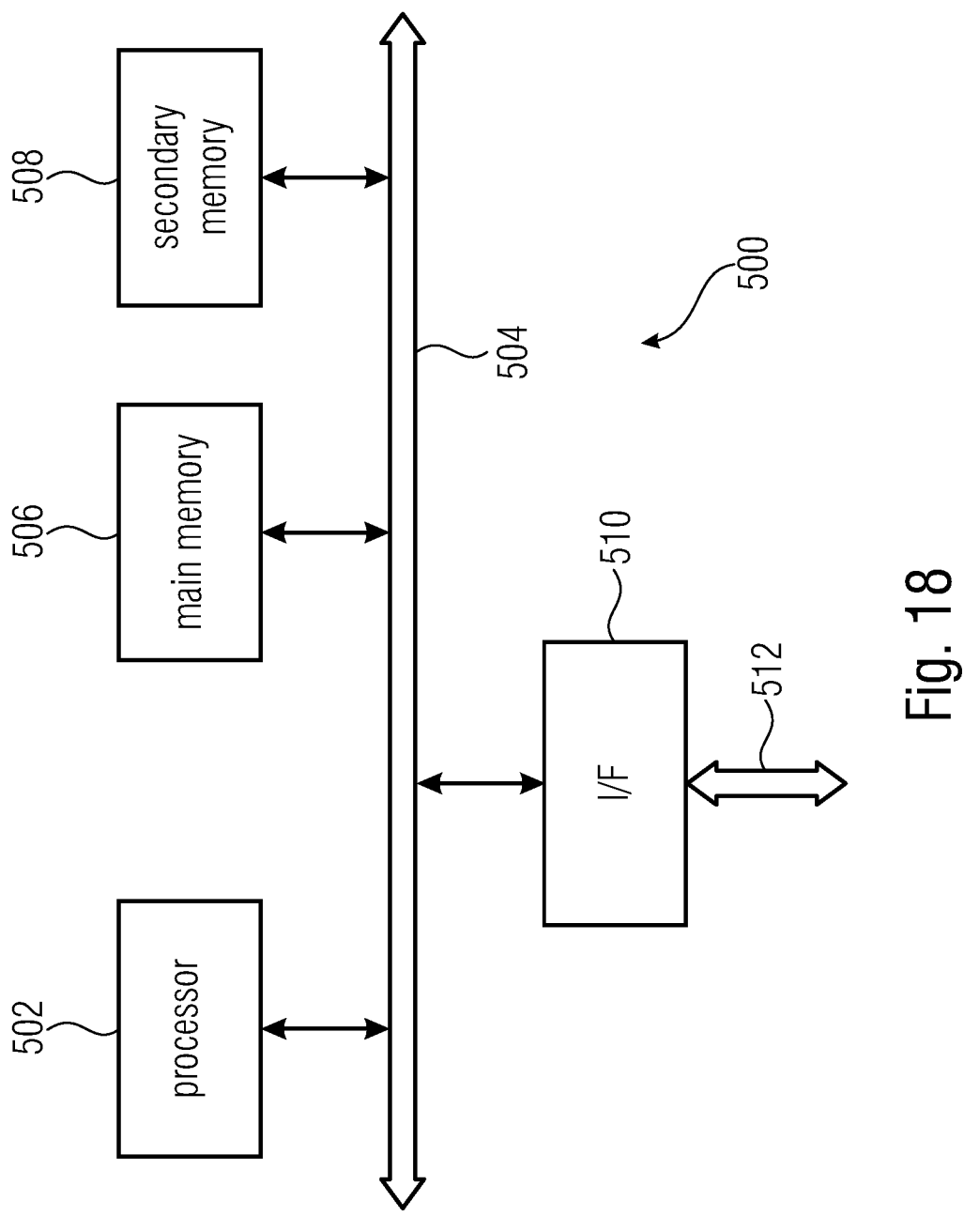

FIG. 6(*a*)-(*d*) shows examples of a predictive sensing using short sensing windows, SSWs, defined using the TRIV parameter received in a SCI;

FIG. 7(*a*)-(*b*) illustrates examples for the reservation of resources for a further transport block using an SCI associated with an earlier transport block;

FIG. 8 illustrates an example of a SSW having a duration less than a reservation window;

FIG. 9 illustrates a graph showing a detection rate versus an actual sensing duration;

FIG. 10 to FIG. 12 illustrate examples of different detection rates a UE may achieve using varying window sizes;

Figure 15:
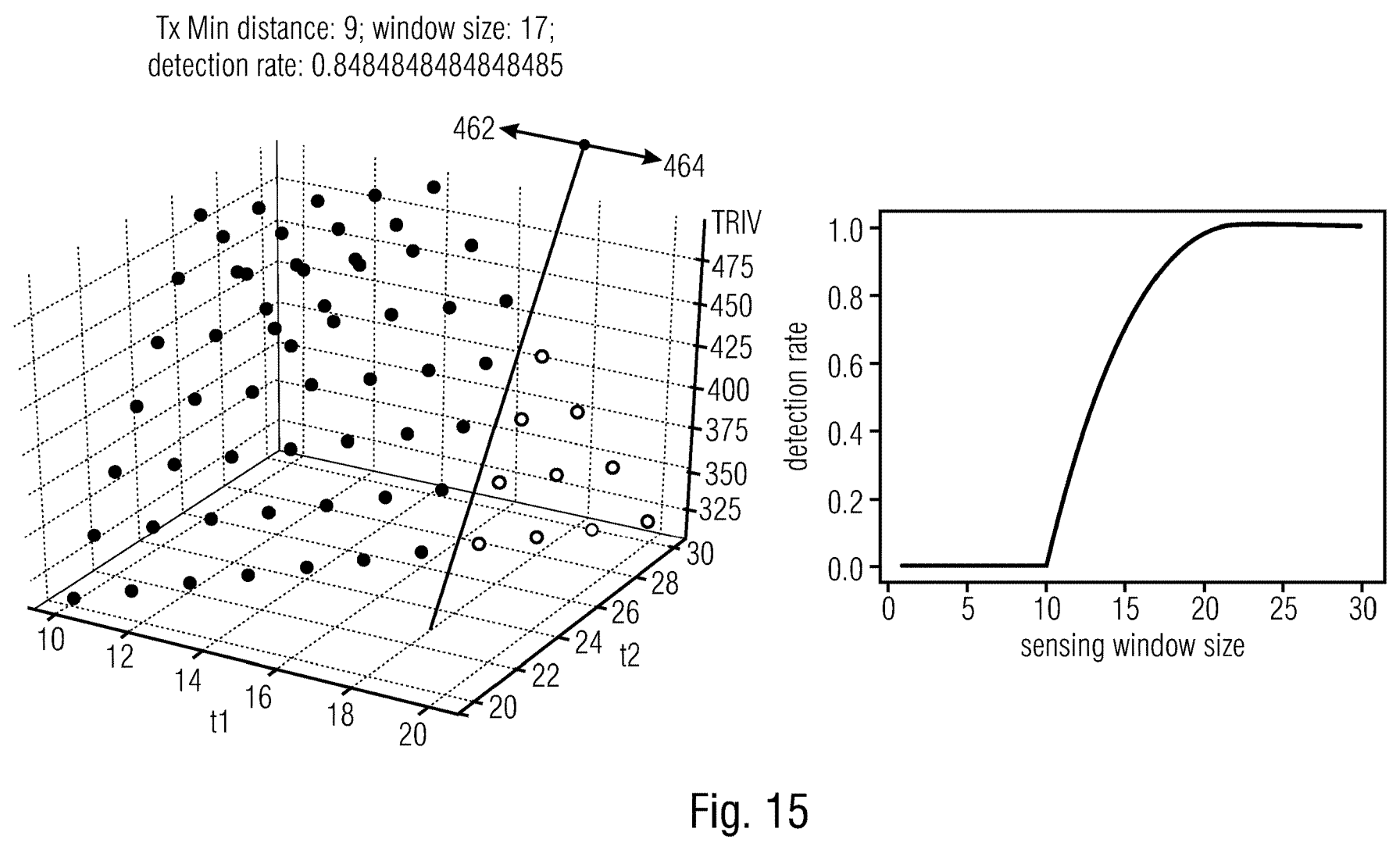

FIG. 13 to FIG. 15 illustrate examples of using TRIV values yielding t1 and t2 values including at least a minimum time duration between the transmissions;

FIG. 16 illustrates an example for an optimum restriction of the SSW;

FIG. 17 illustrates an embodiment of a pre-transmission SSW used by a UE to facilitate preemption; and FIG. 18 illustrates an example of a computer system on which units or modules as well as the steps of the methods described in accordance with the inventive approach may execute.

Embodiments of the present Invention are now described in more detail with reference to the accompanying drawings, in which the same or similar elements have the same reference signs assigned.

In a wireless communications network, like the one described above with reference to FIG. 1, a vehicle-to-everything, V2X, communication may be implemented in accordance with the existing releases of the 3GPP standard. For such V2X communications, the concept of resource pools may be used, i.e., the system or network may provide a set of resources, referred to in the following as a sidelink pool or sidelink resource pool, to be used by user devices within the network for a V2X communication. For example, the sidelink pool may be a set of resources configured by a base station so that a user device may use the resources of the sidelink pool exclusively for V2X communications. For example, separate sidelink resource pools may be defined which are used for Mode 1 and Mode 2 resource allocation modes.

In Mode 1, a UE may carry out sensing, e.g. to generate a sensing report, like an occupancy report, to be reported to a base station or another UE, for example a group leader UE. In Mode 2, a UE may autonomously carry out resource selection and allocation by sensing. For example, in Mode 2, the UE autonomously selects resources using the following steps:

The UE carries out sensing of the entire sidelink pool, i.e., all resources of the sidelink pool are sensed. At each instance n in time, e.g., at each time slot, the UE senses all resources of the sidelink pool. For example, when considering a sidelink resource pool where a UE intends to transmit, a sensing window having time resources spanning a period between 100 ms and 1100 ms is defined prior to the transmission. The UE takes into consideration the sensing results within the sensing window for the said transmission. The size of the sensing window may be set by the network and defined by the specification of the 3GPP standard TS 38.331, indicated by the parameter sl-SensingWindow-r16 in the information element SL-ResourcePool, and may take a range of values between 100 ms and 1100 ms. For example, for certain UEs, the sensing window may have a duration of 1000 ms or time slots. The UE carries out sensing in all the slots of the resource pool by comparing a Reference Signal Received Power, RSRP, measurement in resources in the respective time slots to a predefined RSRP threshold, to determine whether the resource is available to use for potential transmissions or not.

Based on the sensing results, the UE excludes sidelink pool resources which it determines to be reserved by other UEs.

Following the sensing and exclusion of reserved resources, the UE selects final resources to be used for its transmission within a selection window following the time slot n.

Each sidelink resource pool configuration may contain a maximum number of resources that may be reserved and indicated in a control message or control information, like the sidelink control information, SCI, that is associated with a certain transmission to be transmitted between user devices over the sidelink using resources from the sidelink resource pool. For example, the maximum number of resources that may be reserved and indicated in the SCI may be restricted to two or three resources. The resources include in the time domain respective time slots or symbols, and in the frequency domain respective subcarriers. Resources may be located with one or more active bandwidth parts (BWP), whereas a BWP is a subset of contiguous common resource blocks (CRBs) for a given numerology on a given RF carrier. Note, the used resources may be as large as the BWP, may be less, or may be adjusted adaptively according to the operational conditions of the given UE. In this specification, a resource may be one or more of a time resource, a frequency resource, a spatial resource, and a code resource, including, for example, a subchannel, a radio frame, a subframe, a time slot, a resource block, RB.

In view of this limitation of reservable resources, the SCI may include a single time and frequency resource assignment field to indicate the resources. The size of the time resource assignment field may vary, for example it may be 5 bits if the number of resources indicated is only two resources, while it is 9 bits if the number of resources indicated is three resources. The size of the frequency resource assignment field may also vary, for example it may be 8 bits if the number of resources indicated is only two resources, or it is 13 bits if the number of resources indicated is three resources. Dependent on the size of this field, a receiving UE, i.e., a UE receiving a transmission associated with a SCI, which indicates in the time and frequency resource assignment field the resources reserved, is able to determine the number of resources that are indicated by the SCI.

For example, the time and frequency resource assignment field in the SCI indicates a time resource indication value, TRIV, and a frequency resource indication value, FRIV. In case the SCI includes a TRIV, the receiving UE may derive one or two values, corresponding to two or three resources, dependent on the size of the field, apart from the time slot in which the receiving UE receives the SCI, and the PSSCH attached to the time slot is the occurrence of the first resource. Using the TRIV values, the values t1 and t2 may be obtained, where t1 is the time between a current time slot in which the SCI was received and a second time slot, and t2 is the time between the current time slot and a third time slot. For example, if the TRIV has a length of 5 bits, indicating two resources, the resources on which the receiving UE expects receiving a transmission or transport block, TB, is a resource in the current time slot and a resource in the t1 time slot. If the TRIV has a length of 9 bits, thereby signaling three resources, the receiving UE derives both t1 and t2 using a formula as determined in the associated specification of the 3GPP standard TS 38.214 so as to determine the two future or further time slots in addition to the current time slot in which the SCI was received. The values t1 and t2 are restricted to be within a certain window, also referred to as a reservation window, having a size of, for example, 32 time slots. From the single TRIV value, the receiving UE may determine a single value pair of t1 and t2, and the following table give some non-exhaustive examples for TRIV values and the value pairs t1, t2 that may be derived.

| TRIV Value | t1 | t2 |
|---|---|---|
| 32 | 1 | 2 |
| 61 | 30 | 31 |
| 91 | 1 | 31 |
| 311 | 10 | 20 |
| 371 | 10 | 22 |
| 403 | 12 | 25 |
| 482 | 1 | 17 |

Figure 3:
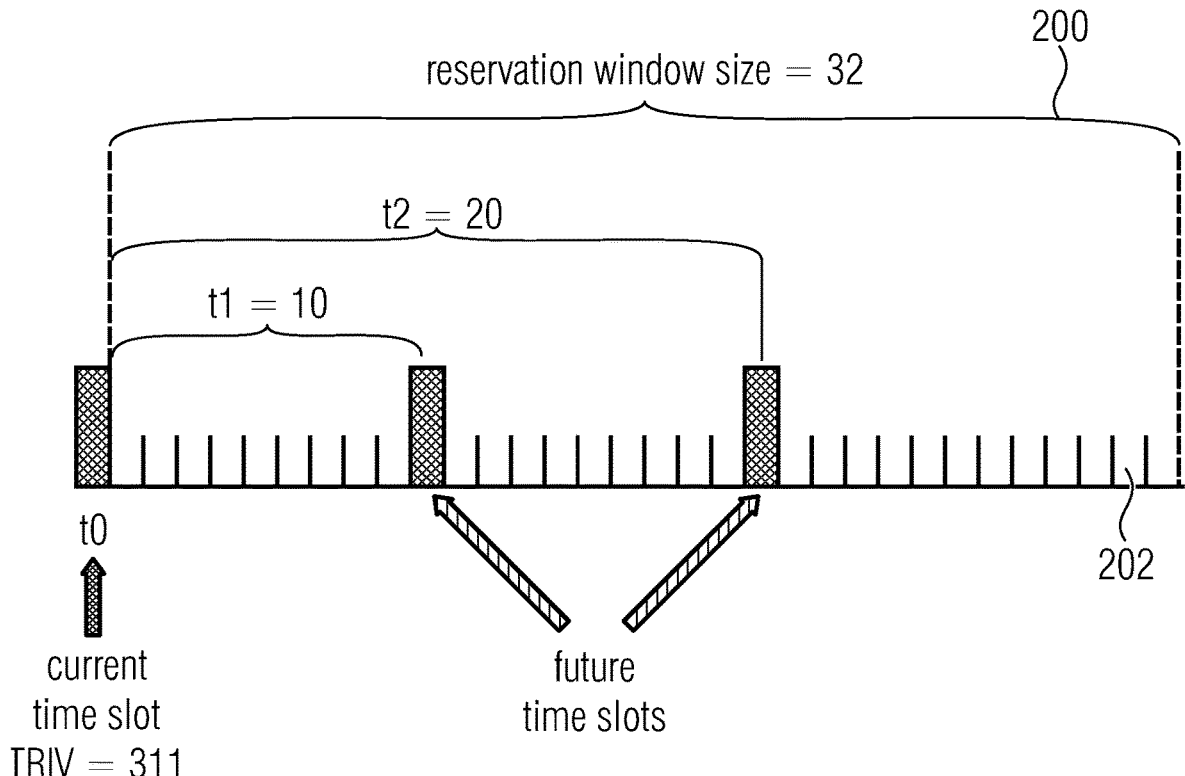

Thus, when considering a t1 value of 10 ms and t2 value of 20 ms, the resource reservation is signaled by a TRIV value of 311 within the SCI. When receiving such a SCI, the receiving UE determines the current time slot and the future time slots, as illustrated in FIG. 3, which indicates the values t1 and t2 derived from a TRIV value 311 as indicated in an SCI. As may be seen from FIG. 3, the reservation window 200 starts at a current time slot to, at which the SCI associated with the transmission is received at a receiving UE. In the example of FIG. 3, the reservation window 200 has a reservation window size of 32 time slots 202. The SCI, in the example, includes a TRIV value of 311 on the basis of which the receiving UE determines that the value of t1 is 10 ms and the value of t2 is 20 ms. Thus, the receiving UE is aware that in addition to the current time slot, also time slots t1 and time slots t2 are reserved for a transmission or a transport block by the UE that was sending the initial SCI associated with the initial transport block.

The indication of the resources in time and frequency is carried out both for Mode 1 and Mode 2 transmissions. As mentioned above, in Mode 1 a UE may carry out sensing, e.g. to generate a sensing report, like an occupancy report, to be reported to a base station or another UE, for example a group leader UE, and in Mode 2 a UE may autonomously carry out resource selection and allocation by sensing. For example, in Mode 2, the UE autonomously selects resources as described above in that the UE carries out sensing of all resources of the sidelink pool, i.e., also the resources of the reservation window described above with reference to FIG. 3. For carrying out sensing in the slots of the reservation window, the UE may compare a Reference Signal Received Power, RSRP, measurement in resources in the respective time slots to a predefined RSRP threshold, which may depend on a priority of an intended transmission of a transmitting UE, and the priority indicated in the SCI received at the given resource, where the SCI is associated with a transmission by another transmitting UE.

Once the resources are selected, the UE may utilize the resource in a current time slot and may reserve future resources by sending an SCI associated with the transmission indicating via the TRIV value, for example, the future or further resources to be used, as explained with reference to FIG. 3.

Another resource pool specific feature is the possibility to reserve, during an initial transmission of a transport block, TB1, resources for a further transport block, TB2, using the SCI associated with the earlier transport block, TB1. This feature may be limited to Mode 2 UEs and may be indicated by a parameter si-MultiReserveResource. In case such a feature is enabled, the UE may reserve the same resources indicated by the values t1 and t2 also for the later transport block TB2, for example after a certain time period referred to as the resource reservation period that may be indicated in the SCI associated with the TB1. The value for the resource reservation period may be selected from a higher layer parameter sl-ResourceReservePeriodList that may contain 16 values configured per resource pool. These values are determined from:

a list1 of possible periods {ms0, ms100, ms200, ms300, ms400, ms500, ms600, ms700, ms800, ms900, ms1000}, wherein ms0 indicates that this feature is disabled, a list2 of possible periods {1 . . . 99}.

When a UE carries out a transmission, one among the 16 values, which are configured for the resource pool, may be indicated in a first stage SCI, for example using the SCI format 1-A, by the "resource reservation period" parameter. The SCI formal 1-A may contain three time/frequency indications for resources, indicated by the TRIV, namely time/frequency indications with respect to a current time slot used for TB1, time/frequency indications with respect to the current time slot plus the indicated resource reservation period that are used for TB2.

In case this feature is disabled, the maximum number of resources defined in a SCI is fixed to three resources. Apart from reserving resources for another TB, resources may also be reserved in a periodic manner in a similar way as is done in LTE for Semi Persistent Scheduling, SPS, transmissions. In this case, the interval of the periodicity may be indicated by the higher layer parameter $P_{rsvp\_TX}$, and the value may be selected from one among the allowed values indicated in the sl-ResourceReservePeriodList. Based on this periodicity, the same set of up to three time/frequency resources may be reserved for periodic transmissions at the given interval, and a counter for the number of times the periodic transmission is repeated may be maintained by the parameter $C_{resel}$.

As described above, to find resources available for a transmission at a certain time slot, the UEs carries out a sensing of all resources of the sidelink pool, even though the UE considers only the resources within the predefined sensing window. Since a UE is to be able to transmit a packet as soon as it is ready for transmission, the UE carries out sensing on all the time slots of the sidelink pool, so that it is capable of selecting the resources for transmitting the packet. However, performing such sensing of all resources of the sidelink pool, which involves the above-described measurements and comparison operations, goes together with a substantial consumption of power. While this may not be an issue for vehicular UEs, which may rely on a power source of the vehicle in which they are implemented, V2X communications may not be limited to such vehicular use cases, but also public safety and commercial use cases are to be considered in which the user device, UE, like a pedestrian UE, P-UE, is battery operated so that power efficiency is an issue. With the above-described, conventional approaches, which require the UE to constantly sense the entire sidelink pool, the battery of a user device, like P-UE, may be drained quickly by the sensing operation.

Therefore, in accordance with the present invention, improvements and enhancements for UEs carrying out sensing, for example UEs being battery-operated, are provided so as to allow such UEs to carry out an effective sensing, e.g., for selecting and allocating resources in an efficient manner, while, at the same time, not consuming the same amount of energy as a full-powered UE.

The present invention achieves power savings at the UE by carrying out a limited or reduced sensing, i.e., by sensing not on all resources of a sidelink pool but only one or more time resources of the sidelink pool, also referred to as one or more subsets of time resources. Within a subset, the time resources sensed may be consecutive time resources. A number of time resources of a subset is lower than the number of time resources of the sidelink pool. Stated differently, a duration of a subset in time is shorter that a duration covered by the time resources of the sidelink pool in time. The subset may also be referred to herein as a reduced or short sensing window, SSW, or as a short listening window, SLW. Outside of the subset, i.e., during time resources/time slots of the sidelink pool outside the subset, also referred to as a non-sensing-interval or non-sensing-region, the UE is not expected to carry out sensing. Since the UE may predict the reservation information from other UEs using the resource pool by sensing within the subset, the UE may power down, or cease to receive any transmissions from other UEs outside the subset of time resources. This results in considerable power savings when compared to a UE that is expected to carry out sensing for the entire sidelink pool, and is especially relevant for pedestrian or IoT UEs. Furthermore by predicting transmissions, the UE may refrain from decoding control information and thus safe power. One or more subsets may be used, which are separated by non-sensing-intervals. Applying the reduced sensing in accordance with the present invention avoids the need to sense all resources of the sidelink pool, thereby reducing the power consumption due to the reduced sensing operations. The plurality of subsets may have the same or a different number of time resources, i.e., the duration of the subset may be the same of may be different.

The UE may carry out sensing by power detection or decorrelation of reference signals, e.g. using on or more of the following signals or measurements: the Channel Busy Ratio, CBR, Channel Congestion Ratio, CR, the Reference Signal Received Power, RSRP, the Reference Signal Received Quality, RSRQ, Radio Signal Strength Indication, RSSI, the Signal to Noise Ratio, SNR, the Signal to Interference and Noise Ratio, SINR, the Channel State Information, CSI, the Precoding Matrix Index, PMI, the Rank Indicator, RI, the Demodulation Reference Signal, DMRS, the Sidelink Primary Synchronization Signal, SPSS, the Sidelink Secondary Synchronization Signal, SSSS.

The UE may process the sensing information obtained from the subset of time resources, and identify resources for a transmission, only when the UE has data to transmit in its transmission buffer.

Embodiments of the present invention provide approaches for a predictive resource allocation with limited or partial sensing. More specifically, embodiments of the present invention are based on the finding that power savings may be achieved for a UE by carrying out limited or reduced sensing, and not during the entire sidelink pool. Applying the reduced sensing is possible by exploiting the knowledge a UE may have about occupied resources signaled in an SCI associated with a transmission. The UE may decode the received SCIs, and even in case the SCI indicates that the associated transmission is directed to another UE, the UE obtains from the SCI the information about other resources that the transmitting UE may use with in the reservation window. The UE may record or store this information to be used when determining at a slot n the available resources for a transmission. For example, with respect to a single transmission or a transport block, TB, when an SCI associated with the TB is received at a UE, the SCI specifies the time resource assignment by means of TRIV value, and, if used, the resource reservation period. Based on this information, the receiving UE knows the following:

based on the number of bits used for TRIV, the receiving UE knows whether there are one or two further resources in future time slots that are used by the transmitting UE, and where these time slots are located with reference to the time slot in which the SCI was received, and based on the reservation period, if used, the receiving UE further knows after what period or interval the same time slots are reserved again for the transmitting UE.

Thus, when receiving and decoding such a SCI, the UE gains knowledge about further transmission occurrences at other slots in the reservation window so that for these slots sensing may be omitted. Based on the knowledge gained, the UE is, nevertheless, able to reliably predict occupied resources within the reservation window without the need for performing a full sensing, i.e., sensing all resources in the reservation window, rather, a SSW with a shorter duration than the sidelink pool and even shorter than a reservation window or a plurality of SSWs separated by respective non-sensing-intervals may be employed. To allow for a reliable prediction, it may be preferred to receive the control information, SCI, within the subset or SSW. Based on the SSW, the UE may predict reliably the other resources occupied by transmitting UEs. This allows the UE to efficiently determine the occupancy status of the resources in case it performs sensing for finding available resources for a transmission by its own, while, at the same time, avoiding the need to sense the entire sidelink pool or even the reservation window, thereby reducing the power needed for performing the sensing operation. Thus, the inventive approach is advantageous over conventional approaches as it allows a UE select and allocate resources in an efficient manner while, at the same time, reducing power consumption.

Figures 1A, 1B:
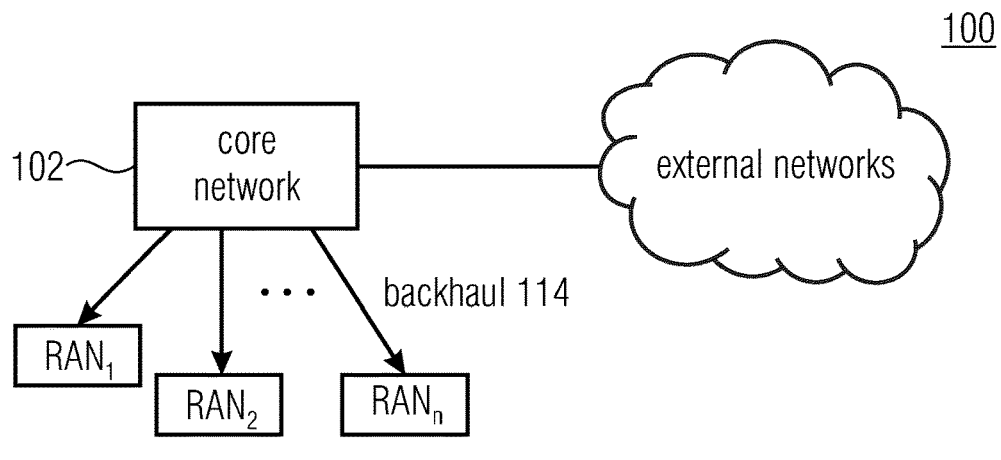
Figure 2A:
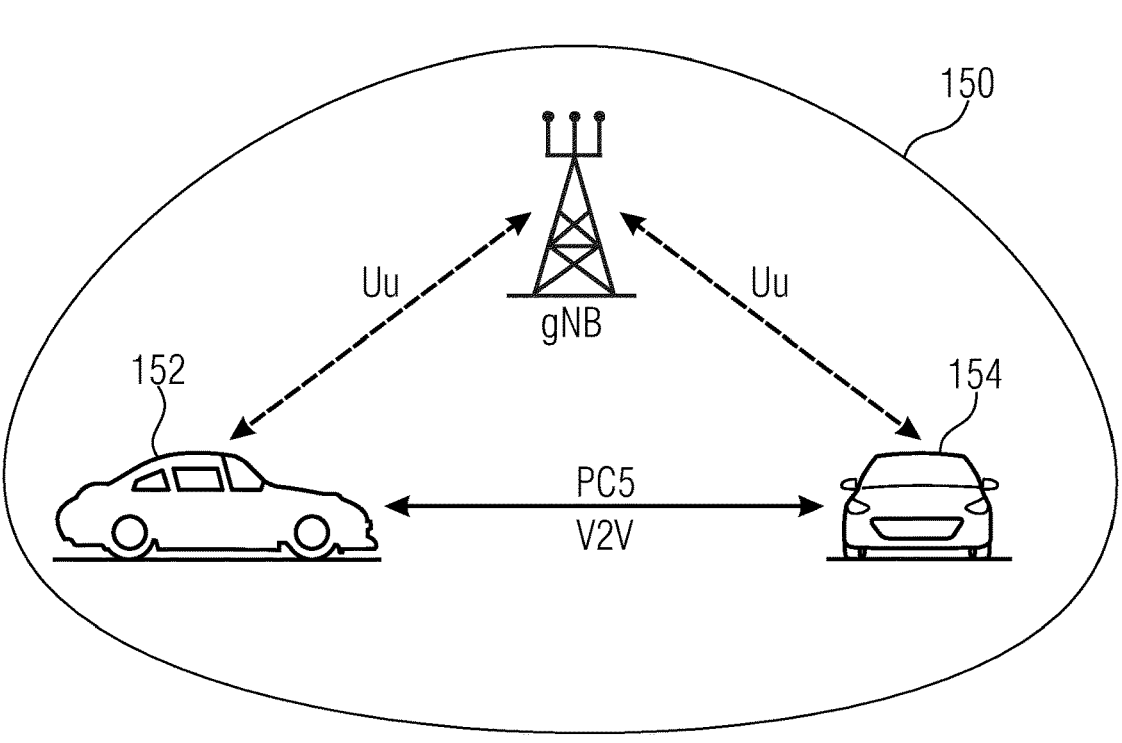
Figure 2B:
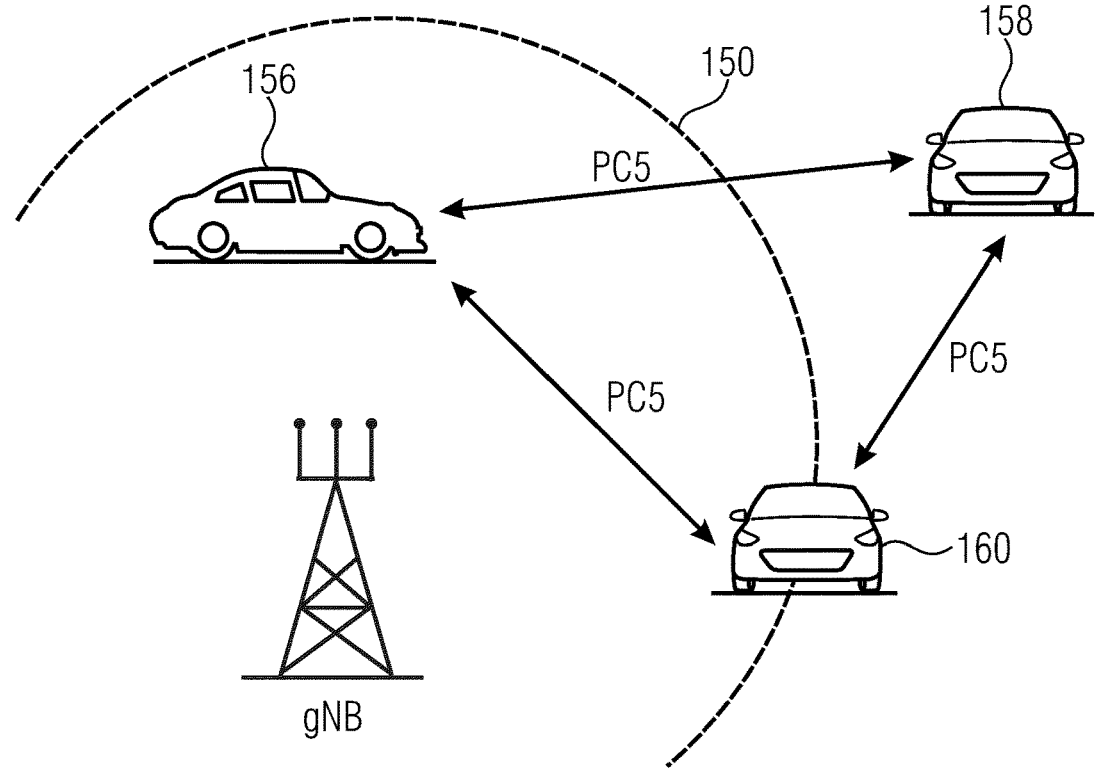
Figure 4:
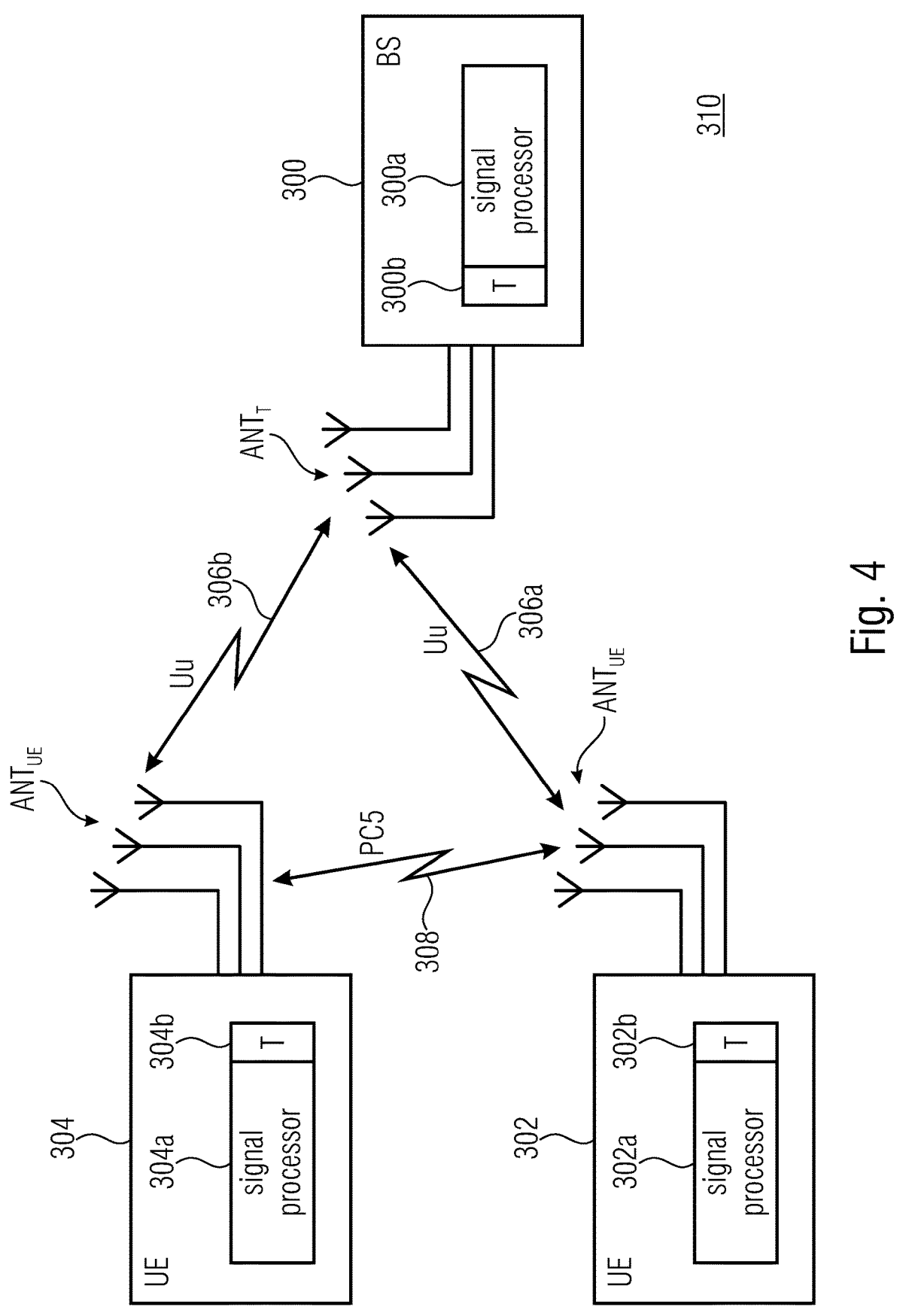
FIG. 4 is a schematic representation of a wireless communication system including a transmitter, like a base station, one or more receivers, like user devices, UEs, and one or more relay UEs for implementing embodiments of the present invention.

Embodiments of the present invention may be implemented in a wireless communication system as depicted in FIG. 1 including base stations and users, like mobile terminals or IoT devices. FIG. 4 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink, SL, interface. When the UEs are not served by the base station or are not connected to a base station, for example, they are not in an RRC connected state, or, more generally, when no SL resource allocation configuration or assistance is provided by a base station, the UEs may communicate with each other over the sidelink, SL. The system or network of FIG. 4, the one or more UEs 302, 304 of FIG. 4, and the base station 300 of FIG. 4 may operate in accordance with the inventive teachings described herein.

UE—Sensing

The present invention provides a user device, UE, for a wireless communication network, the wireless communication network providing a set of resources for communication, wherein the UE is to carry out sensing on one or more subsets of time resources of the set of resources, wherein a number of time resources of the one or more subsets is less than the total number of resources within the set of resources provided by the network.

In accordance with embodiments, outside the one or more subsets of resources the UE is not to carry out one or more of the following:

sensing,
data transmission and/or reception,
switching between reception and transmission,
switching between transmission and reception.

In accordance with embodiments, the UE is to carry out sensing on a plurality of subsets, the plurality of subsets being separated by respective non-sensing-intervals.

In accordance with embodiments, the UE is to carry out sensing of transmission occurrences of one or more transmitting UEs on the subsets of time resources.

In accordance with embodiments, the UE is to operate in one or more of

Mode 1 so as to carry out sensing, e.g. to generate a sensing report to be reported to a base station or another UE, Mode 2 so as to autonomously carry out resource selection and allocation by sensing.

In accordance with embodiments, the set of resources is a transmit, TX, pool or a receive, RX, pool or a TX+RX pool, e.g. a sidelink resource pool.

In accordance with embodiments, the UE is to store sensing results or sensing information for a predefined period of time.

In accordance with embodiments, the UE is to carry out sensing by power detection or decorrelation of reference signals, e.g. using on or more of the following signals or measurements: the Channel Busy Ratio, CBR, the Channel Congestion Ratio, CR, the Reference Signal Received Power, RSRP, the Reference Signal Received Quality, RSRQ, Radio Signal Strength Indication, RSSI, the Signal to Noise Ratio, SNR, the Signal to Interference and Noise Ratio, SINR, the Channel State Information, CSI, the Precoding Matrix Index, PMI, the Rank Indicator, RI, the Demodulation Reference Signal, DMRS, the Sidelink Primary Synchronization Signal, SPSS, the Sidelink Secondary Synchronization Signal, SSSS.

In accordance with embodiments, the UE is to process the sensing information obtained from the subset of time resources, and identify resources for a transmission, only when the UE has data to transmit in its transmission buffer.

In accordance with embodiments, the UE is to carry out sensing by decoding control information.

In accordance with embodiments, the UE is to determine transmission occurrences outside the one or more subsets using the control information received during the one or more subsets.

In accordance with embodiments, the UE is to carry out sensing by decoding only a first stage of the control information, or a first stage and a second stage of the control information, the control information indicating a reservation of future resources within a reservation window, the reservation window having a number of time resources larger than a number of time resources of the subset.

In accordance with embodiments, the control information of the transmitting UE includes one or more of an indication (TRIV) of a plurality of further time slots following a first time slot at which the transmitting UE transmits, an indication (FRIV) of a plurality of frequency resources at which the transmitting UE transmits, and the subset is defined such that the first time slot and/or at least one of the further time slots indicated in the control information falls within the subset.

In accordance with embodiments, a time duration between the first time slot or a first one of the further time slots, and/or between any of the further time slots is at or above a predefined minimum value.

In accordance with embodiments, in case the first time slot and the further time slots are repeated for another transmission after a resource reservation period, the UE is to determine an end of the repetition of resource reservation after the resource reservation period responsive to one or more of:

a counter indicating a number of remaining periodic transmissions, a flag indicating whether a transmission is a last transmission or not.

In accordance with embodiments, the one or more subsets are defined as a pattern across time using one or more of the following parameters:

the time slots of the set of resources in which the UE is to carry out sensing, the time slots of the set of resources in which the UE is not carrying out sensing, a time gap or offset between two consecutive subsets of time slots where the UE is to carry out sensing, a periodicity of the pattern, an overall duration for which the pattern repeats.

In accordance with embodiments, the pattern is further defined across frequency using one or more of the following parameters:

the resources across a frequency of the set of resources in which the UE is to carry out sensing, the resources across a frequency of the set of resources in which the UE is not carrying out sensing, the frequency gap or offset between two consecutive subsets of frequency resources where the UE is to carry out sensing, a periodicity of the frequency pattern, an overall frequency band for which the frequency pattern repeats.

In accordance with embodiments, outside the one or more subsets the UE is to power down or enter a sleep, or DRX, or power saving mode.

In accordance with embodiments, the number of time resources or the duration of the one or more subsets depends on a detection rate, the detection rate being defined as a percentage or ratio of transmission occurrences on the time resources of the one or more subsets to transmission occurrences on all time resources of the set of resources over a configured or preconfigured period of time.

In accordance with embodiments, the UE is to carry out sensing to obtain resources available for a transmission by the UE, and the detection rate for a transmission having a first priority is higher than the detection rate for a transmission having a second priority that is lower than the first priority.

In accordance with embodiments, the UE is configured or preconfigured with the one or more subsets by the wireless communication network, e.g., per resource pool or per TX/RX resource pool for Mode 1 and/or Mode 2 UEs.

In accordance with embodiments, the UE is configured or preconfigured with one or more sensing regions by the wireless communication network, e.g., per resource pool or per TX/RX resource pool for Mode 1 and/or Mode 2 UEs, and the one or more subsets are defined within the one or more sensing regions.

In accordance with embodiments, the UE is to configure the one or more subsets before a certain transmission by the UE.

In accordance with embodiments, in case the UE is to transmit in a time slot n, the UE is to employ a subset before the time slot n, for example from slot n-duration_of_subset-m to slot n-m-1, wherein duration_of_subset refers to time slots of the subset where the UE is carrying out sensing and m is a gap between the sensing and the transmission, with m≥0.

In accordance with embodiments, the UE is to adapt the one or more subsets or is to turn off or disable the one or more subsets based on one or more of the following criteria:

when the UE is to carry out sensing for a transmission having a priority higher than a configured or preconfigured threshold, when the UE is to transmit using HARQ retransmissions, when a congestion status of the set of resources is at or above or below a configured or preconfigured threshold, depending on the UE power status, depending on if the UE has data to send, e.g. buffer status above a threshold.

In accordance with embodiments, adapting the one or more subsets comprises increasing or decreasing the duration or the number of time resources of the one or more subsets.

In accordance with embodiments, when disabling the one or more subsets, to UE is to carry out sensing of all time resources of the set of resources.

In accordance with embodiments, when the UE is to configure the one or more subsets before a certain transmission by the UE and when the congestion status of the set of resources is at or above the configured or preconfigured threshold, the UE is to use one or more subsets configured or preconfigured by the wireless communication network.

In accordance with embodiments, the UE is to carry out sensing within the one or more subsets on one or more of the following occasions:

when the UE is to transmit blind retransmissions, when the UE is to reduce power consumption, e.g. save battery life, when the UE is configured or preconfigured to do so, e.g. by another UE or a gNB or the network, when the UE is configured or preconfigured to use or cater to only a certain service type, e.g. PPDR services or pedestrian services.

In accordance with embodiments, the UE to receive from one or more other UEs one or more Assistance Information Messages, AIMs, including sensing data, like resources available for a transmission, resources not available for a transmission, measured power levels and/or a ranking of resources, and the UE is to use a combination of the sensing results obtained during the one or more subsets and the sensing results in the one or more AIMs to determine the resources to be used for a transmission by the UE.

In accordance with embodiments, the AIM contains one or more of the following:

sensing data, available or occupied resources, the top-m available resources, a set or subsets of resources that can be used for transmissions with different priorities.

In accordance with embodiments, the UE is to reduce the duration of the one or more subsets dependent on the sensing results in the one or more AIMs or in response to the reception of one or more AIMs.

In accordance with embodiments, the UE is to prolong or increase the duration of the one or more subsets of time resources used for sensing, dependent on the sensing results and/or depending on the number of AIMs it could receive/decode.

In accordance with embodiments, in case the UE receives AIMs from a plurality of other UEs, the UE is to consider one or more AIMs from the other UE having the strongest signal strength among the plurality of other UEs, or consider a weighted combination of the received AIMs, or select the AIMs based on the communication distance, e.g. using a zone ID send in an SCI.

In accordance with embodiments, in case the UE carries out sensing for a particular transmission at a future time slot, before attempting to transmit in the future time slot, the UE is to trigger a resource reselection procedure for the future time slot if there are any other transmissions having a priority higher than the attempted transmission in the future time slot In accordance with embodiments, the UE is to evacuate the future time slot, in case not enough sensing results are available during the reselection procedure.

In accordance with embodiments, in case the one or more subsets are configured or preconfigured by the wireless communication network and the UE is to transmit a transmission having a priority at or above a certain priority, the UE is transmit a control message within the configured or preconfigured one or more subsets.

UE—Signaling End of Resource Reservation Period

The present invention provides a user device, UE, for a wireless communication network comprising one or more further UEs which carry out sensing of transmission occurrences of a set of resources, wherein the UE it to periodically transmit one or more transmissions using the set of resources, and wherein the UE is to signal or indicate to one or more of the further sensing UEs the end of the periodic transmissions in one or more of the last periodic transmissions.

In accordance with embodiments, the UE is to transmit one or more transmissions using resources of the set of resources, each transmission associated with control information, the control information including an indication (TRIV) of a first time slot at which the UE transmits and of a plurality of further time slots following the first time slot at which the UE transmits.

In accordance with embodiments, in case the first time slot and the further time slots are repeated for another transmission after a resource reservation period, the UE is to signal to one or more of the further UEs an end of the repetition of resource reservation after the resource reservation period using an indication in the control information.

In accordance with embodiments, the UE is to indicate an end of the periodic transmissions using to one or more of:

a counter indicating a number of remaining periodic transmissions remaining, a flag indicating whether a transmission is a last transmission or not.

UE—Transmitting so that First or Further Time Slots are in Subset

The present invention provides a user device, UE, for a wireless communication network comprising one or more of the above UEs, wherein the UE is to transmit one or more transmissions using resources of the set of resources, wherein the UE is to transmit such that the first time slot and/or at least one of the further time slots indicated in the control information falls within the subset of resources.

In accordance with embodiments, each transmission is associated with control information, the control information including an indication (TRIV) of a first time slot at which the UE transmits and of a plurality of further time slots following the first time slot at which the UE transmits.

In accordance with embodiments, the UE is to transmit such that the first time slot and/or at least one of the further time slots indicated in the control information falls within the subset, unless one or more of the following exceptions apply:

the transmission to be transmitted has a priority at or above a predefined threshold, the transmission to be transmitted has a latency at or below a predefined threshold, the transmission to be transmitted is a blind retransmission there, there are less than two further time slots.

In accordance with embodiments, the set of resources provided by the network comprises one or more of the following:

a sidelink resource pool to be used by the UE for sidelink communications, e.g. a direct UE-to-UE communication via PC5, a configured grant including resources to be used by the UE for NR-U communications, a configured grant including resources to be used a reduced capability UE.

In accordance with embodiments, the user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, or a mobile terminal, or a stationary terminal, or a cellular IoT-UE, or a vehicular UE, or a vehicular group leader (GL) UE, or an IoT or narrowband IoT, NB-IoT, device, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

Network

The present invention provides a wireless communication network, comprising one or more user devices, UEs, according to the present invention.

In accordance with embodiments, the wireless communication network further comprises one or more further UEs or an entity of the core network or the access network of the wireless communication network.

In accordance with embodiments, the entity of the core network or the access network comprises one or more of the following: a macro cell base station, or a small cell base station, or a central unit of a base station, or a distributed unit of a base station, or a road side unit, RSU, or an AMF, or an MME, or an SMF, or a core network entity, or mobile edge computing, MEC entity, or a network slice as in the NR or 5G core context, or any transmission/reception point, TRP, enabling an item or a device to communicate using the wireless communication network, the item or device being provided with network connectivity to communicate using the wireless communication network.

Methods

The present invention provides a method for operating a user device, UE, for a wireless communication network, the wireless communication network providing a set of resources for communication, the method comprising:

carrying out sensing on one or more subsets of time resources of the set of resources, wherein a number of time resources of the one or more subsets is less than the total number of resources within the set of resources provided by the network.

The present invention provides a method for operating a user device, UE, for a wireless communication network comprising one or more further UEs which carry out sensing of transmission occurrences of a set of resources, the method comprising:

periodically transmitting one or more transmissions using the set of resources, and signaling or indicating to one or more of the further sensing UEs the end of the periodic transmissions in one or more of the last periodic transmissions.

The present invention provides a method for operating a user device, UE, for a wireless communication network comprising one or more further UEs according to the present invention, the method comprising:

transmitting one or more transmissions using resources of the set of resources such that the first time slot and/or at least one of the further time slots indicated in the control information falls within the subset of resources.

Computer Program Product

Embodiments of the present invention provide a computer program product comprising instructions which, when the program is executed by a computer, cause the computer to carry out one or more methods in accordance with the present invention.

Figure 5A:
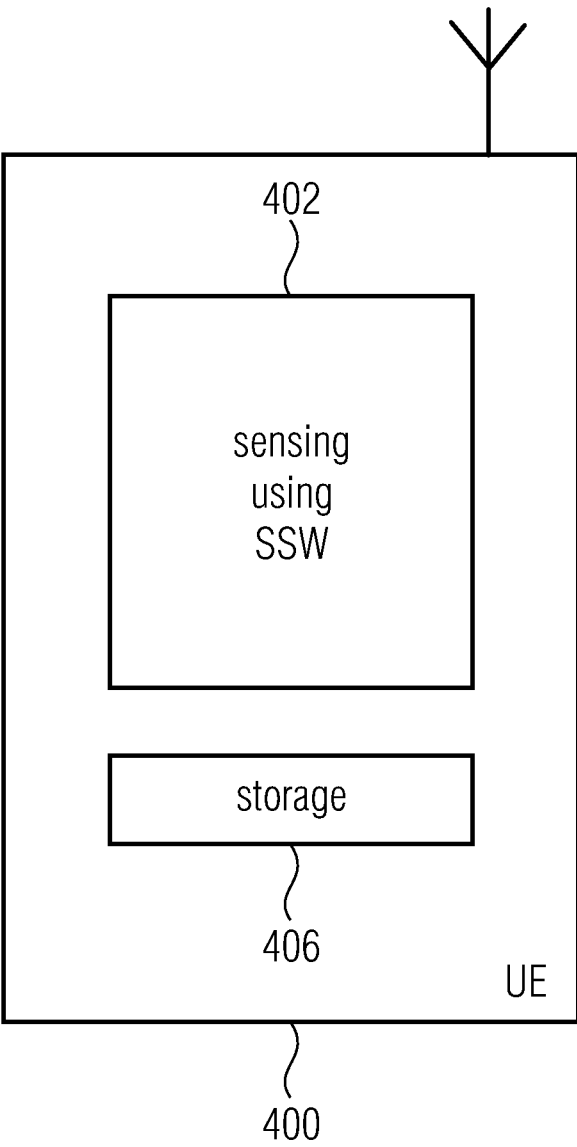
FIG. 5(*a*) illustrates an embodiment of a relay UE in accordance with the first aspect of the present invention.
Figure 5B:
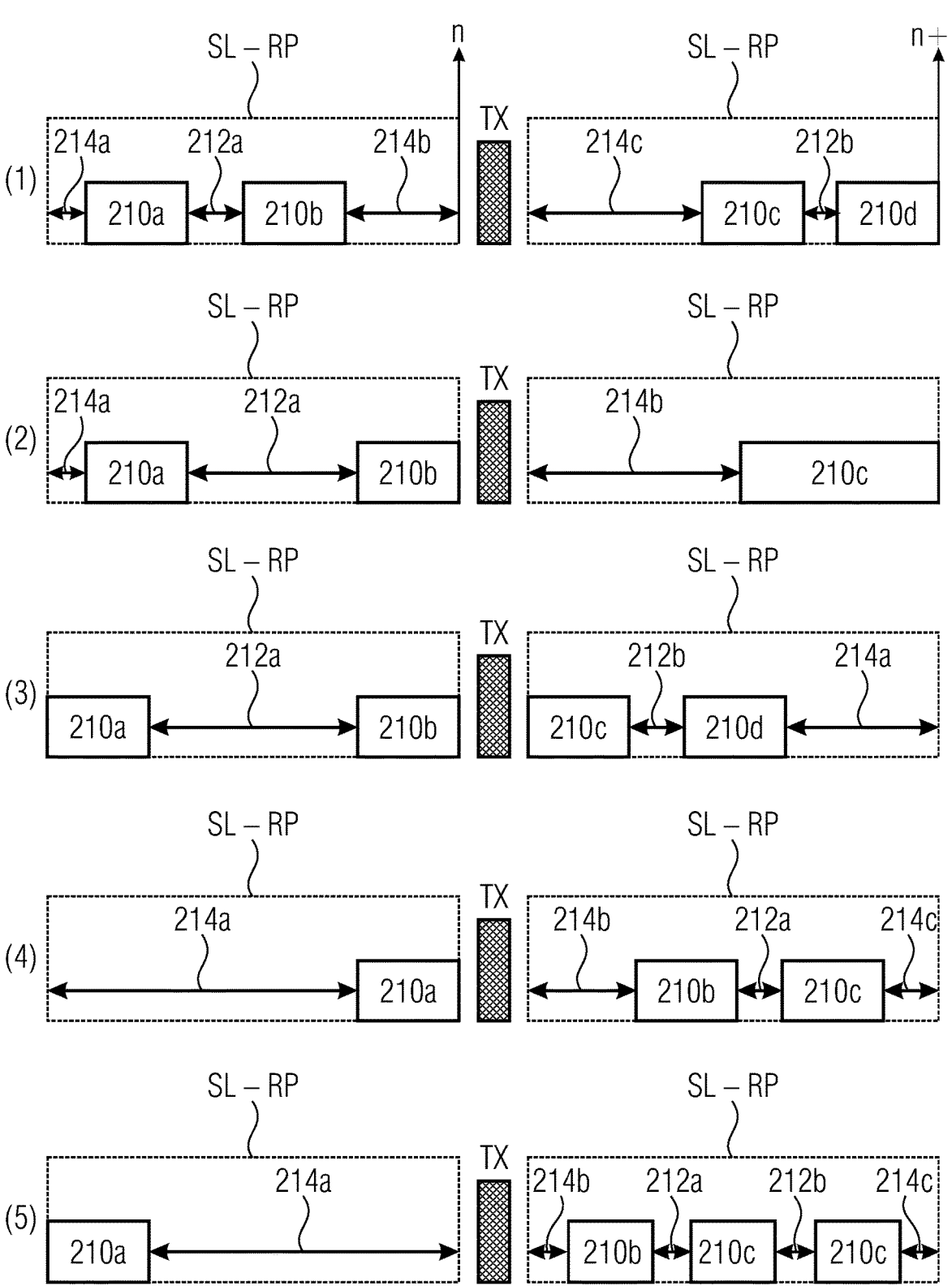
Figure 6A:
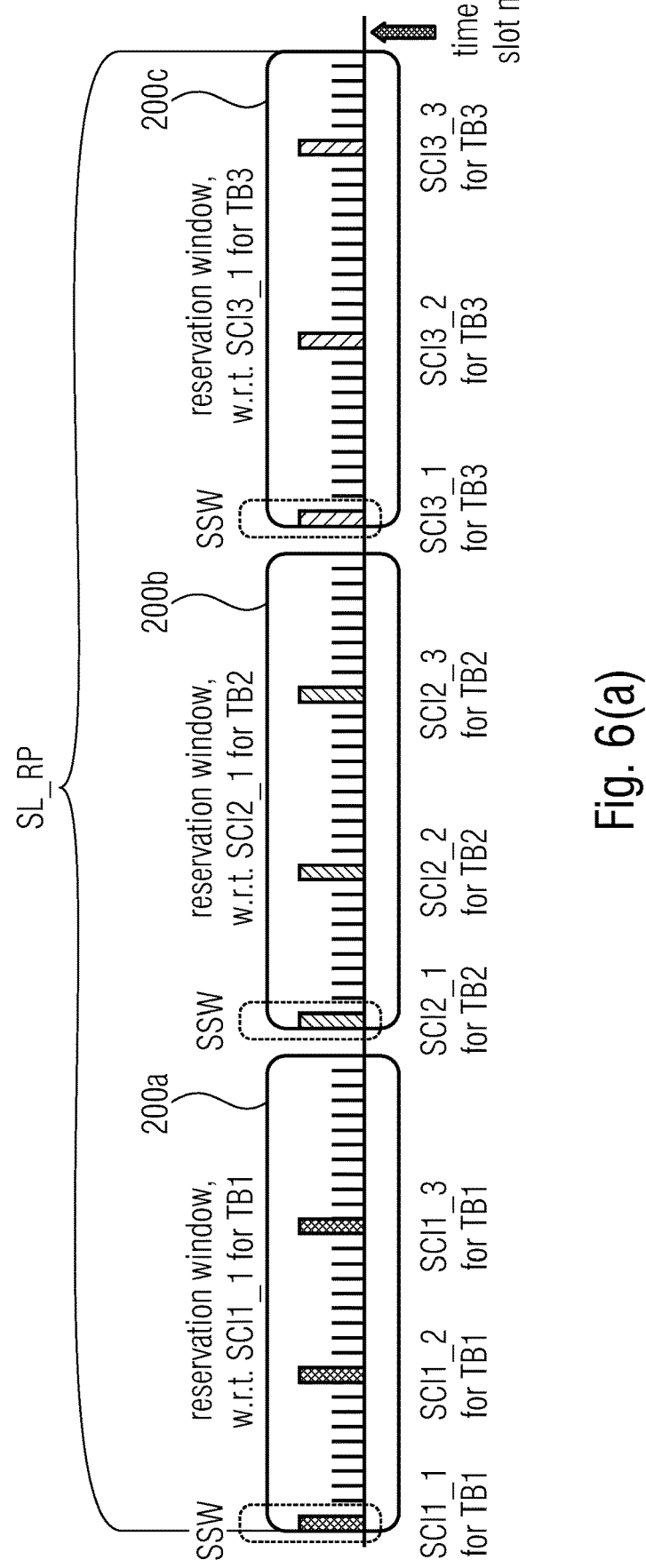
Figure 6B:
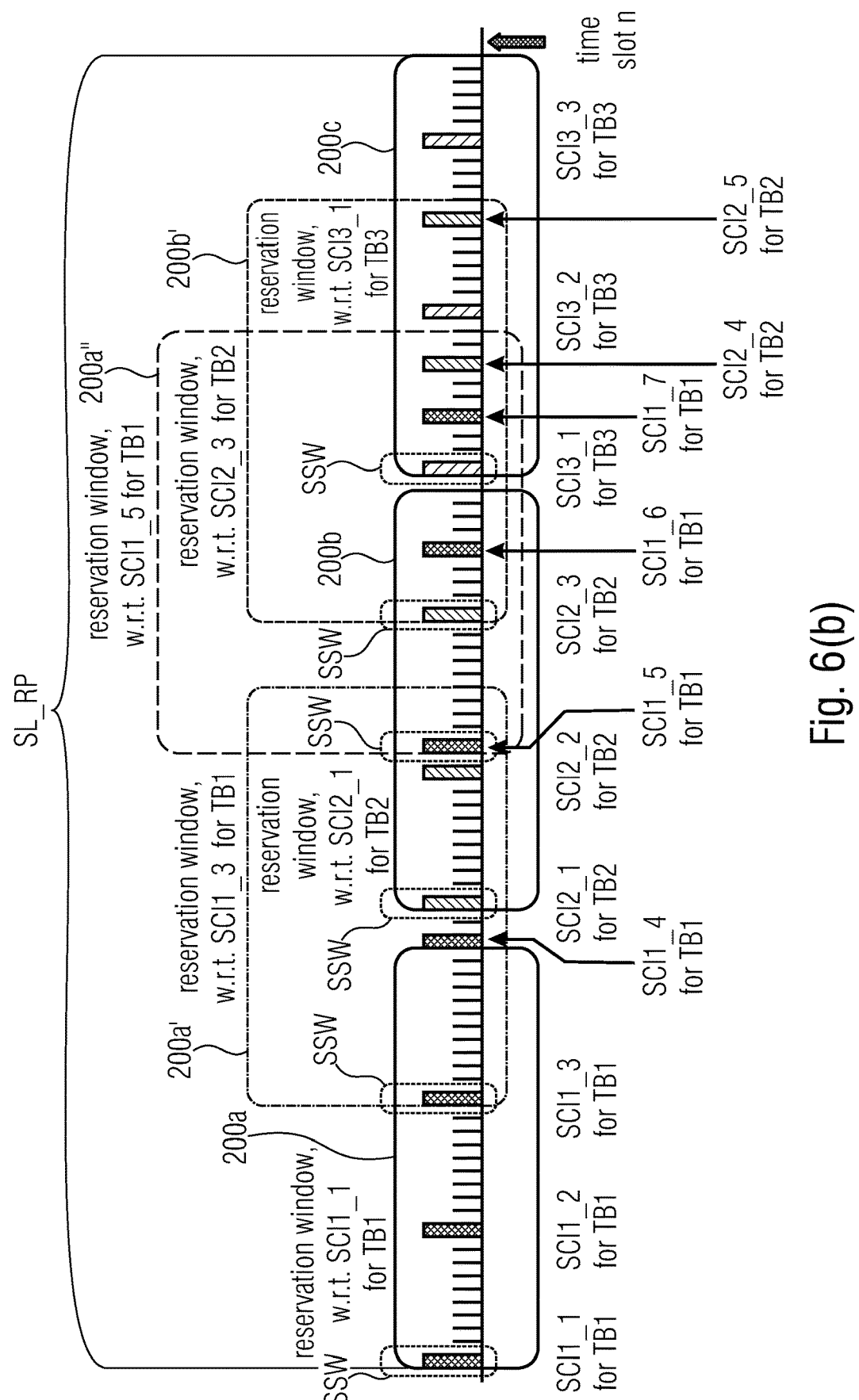
Figure 6C:
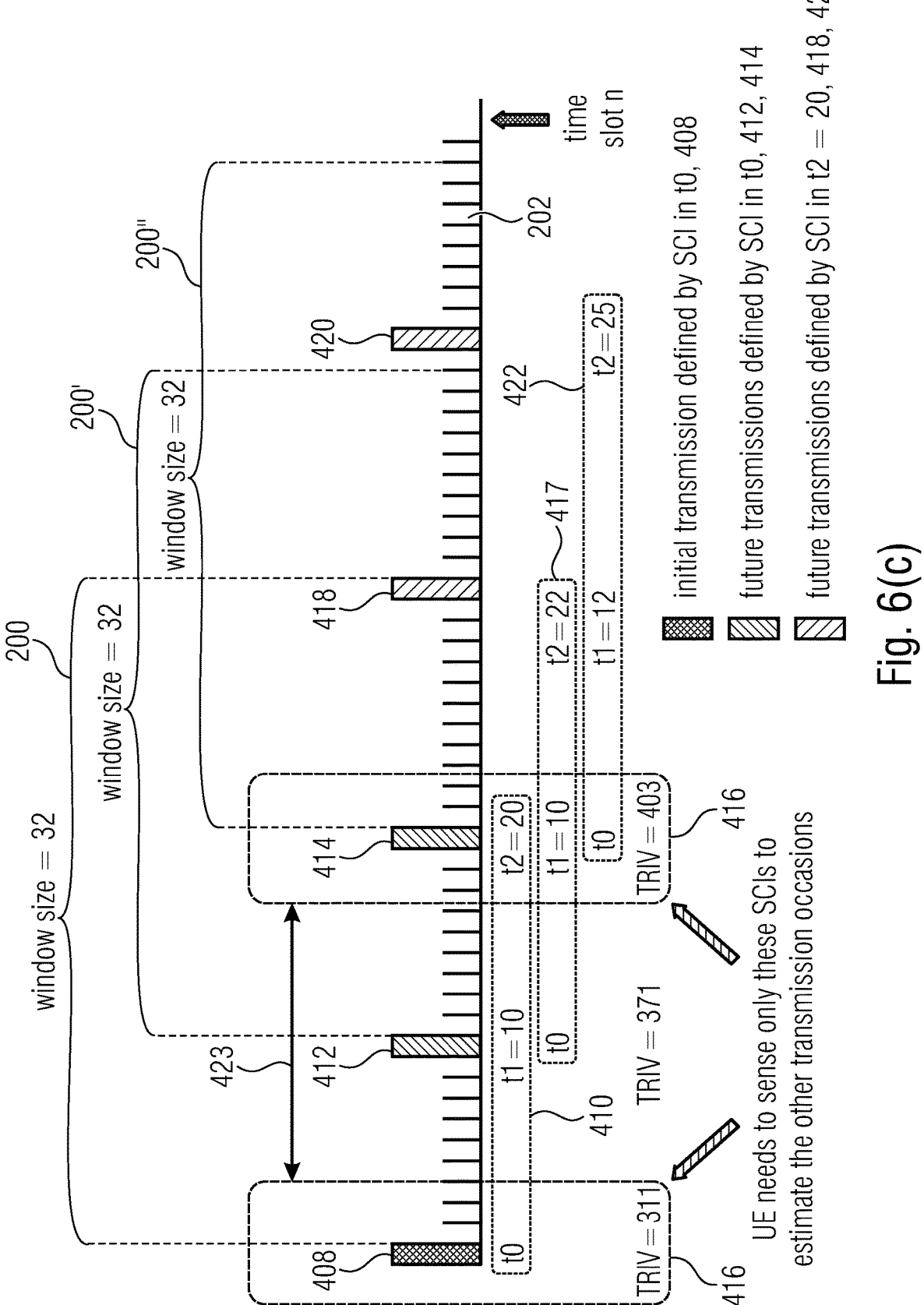
Figure 6D:
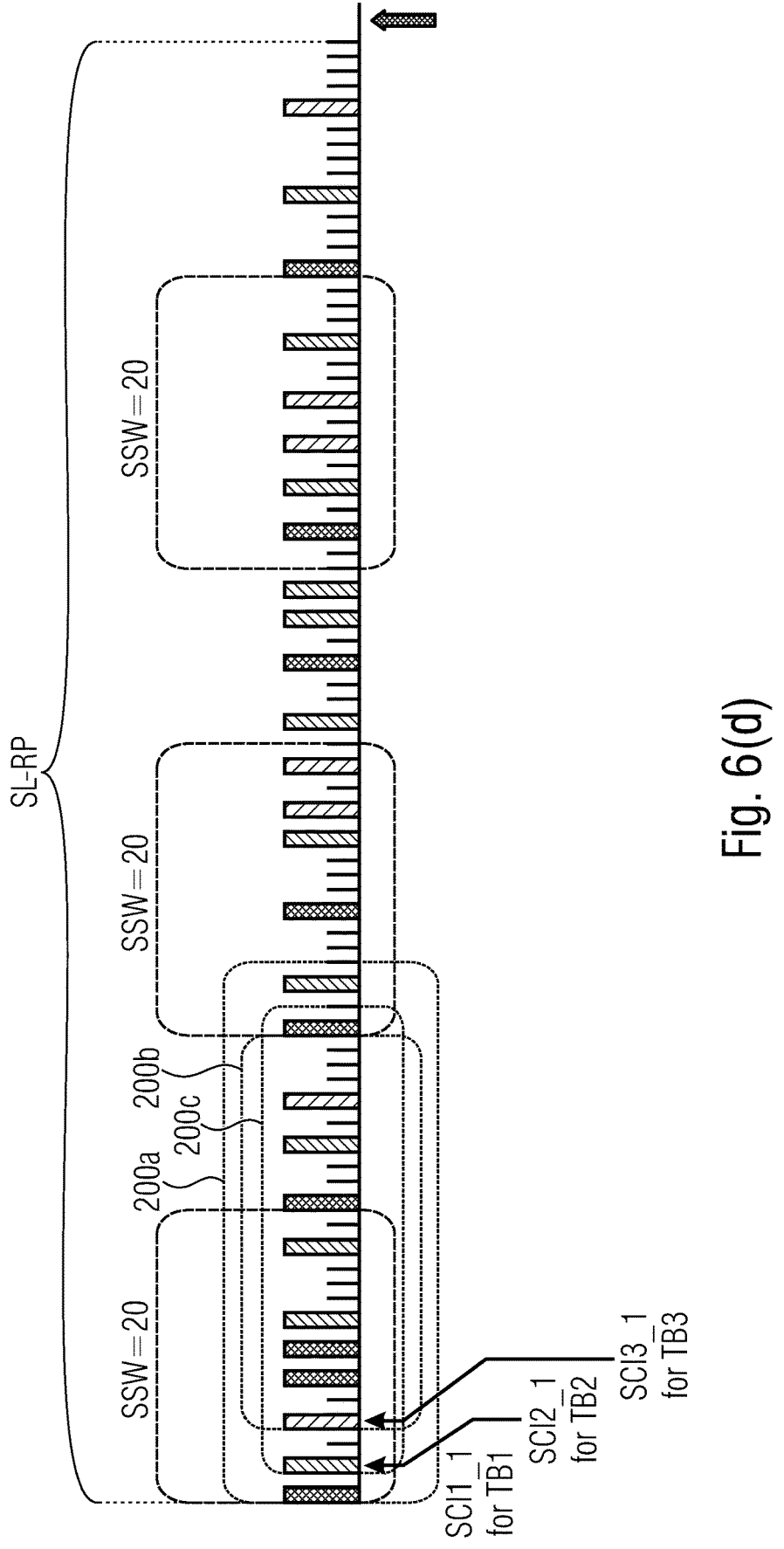

FIG. 5($a$) illustrates an embodiment of a user device, UE, operating in accordance with the teachings described herein. The user device, UE, 400 may be located within a wireless communication system as described above with reference to FIG. 1 and FIG. 4, and may operate in Mode 1 to perform a sensing or in Mode 2, so as to autonomously carry out resource selection and a location by sensing, as is indicated at 402. The UE carries out reduced sensing of transmission occurrences of one or more transmitting UEs within a sidelink pool. Within the sidelink pool, the UE carries out sensing within one or more subsets of time resources or SSWs, wherein, when using two or more SSWs, they are separated by respective non-sensing-intervals. The subsets have a duration shorter than a duration of the sidelink pool.

Contrary to the conventional approaches described above, the UE, in accordance with the inventive approach does not sense all resources of the sidelink pool at a time instance. FIG. 5($b$) illustrates embodiments of one or more subsets or SSWs of the same or different duration. FIG. 5($b$) illustrates a first time instance or time slot n and a second time instance or time slot n+1 and the time resources of the sidelink resource pool, SL-RP, the UE actually senses in accordance with the present invention using only the one or more subsets. The time slots n and n+1 are the time instances where the UE is aware of an upcoming transmission, and has to use the sensing results that it obtained from the subsets indicated prior to these time instances. Following the sensing at time slot n, the UE may transmit, as is indicated by TX, using available resources. The depicted transmission instance TX in FIG. 5($b$) may occur in the time slot immediately after or after a configured or preconfigured time duration following the time instances n and/or n+1.

FIG. 5($b$)(1) illustrates an embodiment in accordance with which the UE 400, at time slot n, carries out sensing during the two subsets of time resources or SSWs 210$a$, 210$b$, that include less than the time resources of the SL-RP. SSW 201$a$ and SSW 210$b$ are separated by a non-sensing-interval 212$a$ during which the UE does not carry out sensing. Further non-sensing-regions 214$a$, 214$b$ are defined in the SL-RP by the offset of SSW 210$a$ from the start of the SL-RP and the offset of the SSW 210$b$ from the time slot n, respectively. At time slot n+1, the UE 400 carries out sensing also during two SSWs 210$c$, 210$d$, which have the same duration as SSWs

210$a$, 210$b$ but include resources of the SL-RP different from SSWs 210$a$, 210$b$. SSWs 210$c$, 210$d$ are separated by a non-sensing-interval 212$b$. Further a non-sensing-region 214$c$ is defined in the SL-RP by the offset of SSW 210$c$ from the start of the SL-RP. In accordance with embodiments, outside the one or more SSWs or subsets, the UE is not to carry out one or more of the following:

sensing, data transmission and/or reception, switching between reception and transmission, switching between transmission and reception.

In FIG. 5($b$)(2), at time slot n, the SSW 210$b$ extends to time slot n so that there is only the non-sensing-interval 212$a$ between SSW 210$a$ and SSW 210$b$ and the non-sensing-region 214$a$. At time slot n+1, only a single SSW 210$c$ is used, which has a duration longer than SSWs 210$a$, 210$b$ and includes in part the same resources as SSW 210$b$. SSW 210$c$ is offset from the start of the SL-RP by non-sensing-region 214$b$.

In FIG. 5($b$)(3), at time slot n, SSW 210$a$ and SSW 210$b$ are located such that there is only the non-sensing-interval 212$a$ between them but no other non-sensing-region. At time slot n+1, again two SSWs 210$c$, 210$d$ are used. SSW 210$c$ has the same duration as SSW 210$a$ and includes the same resources, while SSW 210$d$ has a duration shorter than SSWs 210$a$, 210$b$ and includes resources different from SSW 210$b$. SSWs 210$c$, 210$d$ are separated by a non-sensing-interval 212$b$, and SSW 210$d$ is offset from the time slot n+1 by non-sensing-region 214$a$.

In FIG. 5($b$)(4), at time slot n, a single SSW 210$a$ is provided so that there is no non-sensing-interval 212$a$ but the non-sensing-region 214$a$. At time slot n+1, again two SSWs 210$b$, 210$c$ are used. SSW 210$b$ has the same duration as SSW 210$a$ but includes different resources, while SSW 210$c$ has a duration longer than SSWs 210$a$ and includes in part the same resources as SSW 210$a$. SSWs 210$b$, 210$c$ are separated by a non-sensing-interval 212$a$, and offset by non-sensing-regions 214$a$, 214$b$.

In FIG. 5($b$)(5), at time slot n, a single SSW 210$a$ is provided so that there is no non-sensing-interval 212$a$ but the non-sensing-regions 214$a$ and 214$b$. At time slot n+1, three SSWs 210$b$, 210$c$, 210$d$ are provided which are separated by respective non-sensing-intervals 212$a$, 212$b$. The SSWs may be located such that no, one or both non-sensing-regions 214$a$, 214$b$ exist.

In FIG. 5($b$) different subsets are used at time slots n and n+1. However, in accordance with other embodiments the same subsets may be used at time slots n and n+1.

In accordance with embodiments, the UE 400 may store in a storage 406 (see FIG. 5($a$)) the sensing results for a predefined time or period, e.g., 1000 ms.

The UE 400 may carry out sensing by decoding control information, like SCIs associated with transmission of one or more transmitting UEs. Dependent on the format of the control information, the UE may decode only a first stage of the control information, or a first stage and a second stage of the control information so as to obtain from the control information a reservation of future resources. The UE 400 does not need to carry out sensing over the entire SL-RP, but only over the shorter SSW, during which, in accordance with embodiments, control information regarding transmissions by one or more transmitting UEs are received, on the basis of which the UE determines transmission occurrences outside the SSW. Thus, embodiments of the inventive approach avoid the need to sense the entire SL-RP, rather, on the basis of the control information, transmission occurrences, i.e., occupied resources, outside the SSW may be determined or predicted, so that the sensing is carried in an efficient manner while allowing for a power consumption reduction because sensing operations are limited to a shorter, SSW. For example, the UE 400 carrying out the sensing may power down, for example go into a sleep state, during the respective non-sensing-intervals between the SSWs and during the non-sensing-regions, i.e., when no sensing is performed.

The UE may use the information provided in the SCIs received during the SSW, like the TRIV explained above, to predict resources occupied by transmitting UEs that are outside the SSW. In other words, based on the understanding that an SCI allows the UE to calculate in addition to one resource also one or two further resources, the time spent by the receiving UE 400 to carry out sensing may be reduced. For example, since the number of resources Indicated in a SCI is per resource pool, RP, configuration, when the number is set to two resources, the UE may carry out sensing only half of the time and extrapolate the other resources based on the formula defined in the 3GPP specification TS 38.214 for determining the above values t1 and t2 associated with a received TRIV value. In other words, based on the information in the SCI, the transmission occurrences outside the SSW may be determined rather than actually sensing in this area which allows reducing the sensing time and power needed. In the same way, when the number of resources is set to three resources, the UE may carry out sensing for only ⅓ of the time.

In accordance with embodiments, the SSW has a duration shorter than the reservation window. The SSW may be used by UEs that need to be conservative about their power usage, like pedestrian UEs or IoT UEs. The SSW may also be referred to as a low power listening window, LPLW, or as a lower power sensing window, LPSW. In accordance with embodiments, the SSW is defined such that at least one of the resources indicated in the SCI falls within the SSW. This may either be the initial transmission at to, see FIG. 3, or the future transmissions at t1 or at t2. Reading the SCIs of any of these transmissions enables the UE to determine future upcoming transmission occurrences from the transmitting UE without the need to actually sense these occurrences.

In accordance with embodiments, the SSW may be defined as a time pattern using one or more of the following parameters:

the time slots of the sidelink pool in which the UE is to carry out sensing, the time slots of the sidelink pool in which the UE is not carrying out sensing, a time gap or offset between two consecutive sets of time slots where the UE Is to carry out sensing, e.g., the time gap is the time duration where the UE does not carry out sensing, a periodicity of the pattern, an overall duration for which the pattern repeats.

In accordance with further embodiments, the one or more of the time slots, also a pattern is defined across frequency using one or more of the following parameters:

the resources across a frequency of the sidelink pool in which the UE is to carry out sensing, the resources across a frequency of the sidelink pool in which the UE is not carrying out sensing, the frequency gap or offset between two consecutive sets of frequency resources where the UE is to carry out sensing, a periodicity of the frequency pattern, an overall frequency band for which the frequency pattern repeats.

FIG. 6(*a*) illustrates an embodiment for a predictive sensing using SSWs as taught by the present invention. FIG. 6(*a*) illustrates a part of a sidelink resource pool, SL-RP, which may include more time slots than shown in the figure, to be sensed by UE 400 for a transmission after a time slot n. Three reservation windows 200*a*, 200*b*, 200*c* are shown which are associated with transmissions of TB1, TB2 and TB3, respectively, by one or more transmitting UEs in the network. The SCIs associated with the respective transmissions of TB1, TB2, TB3 at the transmission occurrences during the reservation windows 200*a*, 200*b*, 200*c* indicate, in the depicted embodiment, that a first transmission may be followed by two further transmissions in the reservation window. In accordance with the inventive approach, rather than performing sensing over the entire SL-RP, the UE 400 performs sensing only over the SSWs spanning only a subset of time resources or time slots and also having a duration substantially shorter than the reservation window. This allows for a reliable sensing because the UE 400, when carrying out sensing during the SSWs, receives the SCI indicating the other transmission occurrences in the reservation window so that no sensing is needed there. In the embodiment of FIG. 6(*a*) the SSW may have a duration of only a single time slot.

In accordance with further embodiments, there may be more than three transmission occurrences for a TB. FIG. 6(*b*) illustrates such an embodiment assuming that there are seven transmission occurrences for a TB1, five transmission occurrences for a TB2 and three transmission occurrences for a TB3. In this scenario, SCI 1_1 indicates the resources for the SCIs 1_2 and 1_3, for the retransmissions of TB1. Similarly, each of the SCIs indicate 2 further resources where future retransmissions of the TB occur. Instead of sensing and receiving all the SCIs, additional SSWs are provided at the initial time slots of the additional reservation windows 200*a'*, 200*a''* and 200*b'*, apart from 200*a*, 200*b* and 200*c*, so as to predict the second, fourth, sixth and seventh transmission occurrences of TB1 and the second, fourth and fifth transmission occurrences of TB2.

FIG. 6(*c*) illustrates an embodiment for a predictive sensing using a SSW. FIG. 6(*c*) illustrates a part of a SL-RP, which may include more time slots 202 than shown in the figure, to be sensed by UE 400 for a transmission after time slot n. Three reservation windows 200, 200', 200" are shown which are associated with respective transmissions of a TB by one or more transmitting UEs in the network. Within the reservation window 200', the UE 400 (see FIG. 5(*a*)) receives at a time slot 408 a transmission having associated therewith a SCI including the TRIV field having a value of 311. In accordance with the table above, this means that time slots for two further transmissions are reserved by the transmitting UE, and the values t1 and t2 are 10 ms and 20 ms. Thus, as is indicated at 410, the SCI received at time slot 408 indicates the time slots 408, 412 and 414 at which transmissions by a transmitting UE occur. The reservation window 200 has a duration or length of 32 time slots. In accordance with the inventive approach, rather than performing sensing over the entire SL-RP, the UE 400 performs sensing only over the SSW 416. As Is depicted in FIG. 6(*c*), the transmitting UE transmits such that at least one of the transmissions at to, t1, t2 is within the SSW, for example, in case the SSW is defined globally.

The duration of the SSW 416 may be selected to be substantially shorter than the reservation window, and the UE 400, when carrying out sensing during the SSW 416, is to receive the SCI indicating the transmission occurrences 410 so that no sensing is needed to determine the transmission occurrences at time slots 412 and 414 as they are already known. Thus, as is shown in FIG. 6(*c*), no sensing is carried out at time slot 412. At this slot, the transmitting UE may send a further transmission having associated also an SCI now indicating a TRIV value of 371, meaning that, in accordance with the table above, the values t1 and t2 are 10 ms and 22 ms, respectively. Thus, the SCI received at time slot 412 indicates, as is indicated at 417, the further transmission occurrences at time slots 414 and 418 within the reservation window 200' which are spaced from the time slot 412 by 10 ms and 22 ms, respectively. However, since the transmission occurrence at time slot 414 may be predicted by the UE 400 based on the SCI information received in the SSW 416, the UE does not need to carry out sensing of the time slot 414.

At time slot 414, which is a further transmission occurrence indicated by the SCI received during the SSW 416, a further transmission with an associated SCI occurs, and the SCI indicates a TRIV value of 403, meaning, in accordance with the above table that the t1 and t2 values are 12 ms and 25 ms or time slots, respectively. Thus, within the reservation window 200'', a first transmission occurrence following the time slot 414 is at time slot 418 and is 12 ms from the time slot 414, and a second occurrence is at time slot 420 and is 25 ms from the time slot 414, as is indicated at 422. Since the UE is aware that at the respective time slots additional transmission occurrences may be signaled, in the example depicted in FIG. 6(*c*), a further sensing is carried out using a SSW 416 being shorter than the duration of the reservation window 200' so as to allow the UE 400 to receive the SCI and to predict the transmitting occurrences at time slots 418 and 420.

The scenarios described above with reference to FIG. 6(*c*) illustrates that, despite the fact that the UE uses short, SSWs 416, i.e., SSWs having a duration shorter than the size of the reservation window, which are separated by the non-sensing interval 423, the transmission occurrences within respective reservation windows 200, 200', 200'' may be efficiently and reliably detected while, at the same time, allowing for the power reduction due to the reduced sensing operations needed.

In the example of FIG. 6(*c*), when considering that the size of the reservations windows 200, 200', 200'' has a maximum size of 32 time slots, the sensing duration 416 may be repeated in 32 window cycles. The UE may track individual transmissions of transport blocks and may accordingly wake up to receive the associated SCIs and then go back to sleep without receiving the other SCIs related to the same transmission. In accordance with embodiments, the inventive approach may be used in low traffic scenarios, where the transmissions by transmitting UEs are fewer. This enables a low power UE to sense as much of the initial transmissions of the transmitting UEs using the SSW, and power down within in the same reservation window. In a high traffic scenario, multiple transmitting UEs may transmit in every time slot within a 32 time slot reservation window, depriving the low power UE of a chance to power down within the reservation window.

FIG. 6(*d*) illustrates a further embodiment for a predictive sensing using SSWs in accordance with the present invention. Other than in the preceding embodiments, the SSW may span more time slots, e.g., 20 time slots, so as to sense a plurality of initial transmissions of SCIs associated with different TBs during a short duration so that the reservation windows 200*a*, 200*b*, 200*c* overlap.

In accordance with further embodiments of the inventive approach, the SSW 416 may be defined within a current reservation window based on one or more criteria. For example, when using the above described reservation period and the knowledge when the same set of resources is reserved again in the future, and given the property that all SCIs point to further two or three or more resources, the UE 400 may decide when to carry out sensing within the reservation window dependent on its own requirements.

For example, in case the UE is interested in actually receiving a TB within the reservation window 200, it may remain on and carry out sensing for a duration until it receives the TB. Once the UE received the required TB it may go back to sleep. Thus, the SSW 416 may extend over the reservation window until the TB is received, nevertheless, the duration of the SSW 416 is still shorter than the duration of the reservation window.

In case the UE is interested in transmitting a TB, the UE may carry out sensing for the entire reservation window 200 and extrapolate the remaining repetitive transmissions. This may enable the UE to receive the initial transmission of different TBs, to determine the time slots within the reservation window 200 where further transmissions or retransmissions occur and, based on the reservation period, to determine when the same set of resources are reserved in the future. FIG. 7(*a*) illustrates an example for the reservation of resources for a further transport block, TB2, using an SCI 1 associated with an earlier transport block TB1. FIG. 7(*a*) assumes a resource reservation period 430 having a duration of 50 ms, which is defined in the initial SCI1 received at 432 for a first transport block TB1 that is transmitted by a transmitting UE. The SCI also indicates a TRIV value of 311, thereby indicating the future time slots 434 and 436 at which transmissions of the transmitting UE occur. By applying a SSW 416, the UE determines all transmission occurrences in the reservation window 200, and, based on the reservation period, determines, without sensing, the time slots 438 to 442 as further transmission occurrences.

FIG. 7(*b*) illustrates another embodiment for the reservation of resources for a further transport block using an SCI associated with an earlier transport block. FIG. 7(*b*) illustrates a sidelink resource pool, SL-RP, to be sensed by UE 400 for a transmission after time slot n. Three reservation windows 200*a*, 200*b*, 200*c* are shown which are associated with transmissions of TB1, TB2 and TB3, respectively, by one or more transmitting UEs in the network. The SCIs associated with the respective transmissions of TB1, TB2, TB3 at the transmission occurrences during the reservation windows 200*a*, 200*b*, 200*c* indicate, in the depicted embodiment, that a first transmission may be followed by two further transmissions in the reservation window. In accordance with the inventive approach, rather than performing sensing over the entire SL-RP, the UE 400 performs sensing only over the SSWs spanning only a subset of time resources or time slots and also having a duration substantially shorter than the reservation window. Further, the SCI1_1 for TB1 indicates a resource reservation period 430 having a duration of 50 ms so that the sensing UE, upon sensing SCI1_1 using the SSW according to the inventive approach, knows the additional transmission occurrences for the further transport block TB4 and no sensing for these transmission occurrences during the reservation window 200*a'* for TB4 is performed.

In accordance with other embodiments, the UE may select the SSW 416 over a longer duration of the reservation window, e.g., in case the UE is neither expecting to receive a transmission nor is to send a transmission during the reservation window. In such a case, the SSW 416 may be further reduced, and FIG. 8 illustrates an example of a SSW 416 that is set to 17 time slots within the reservation window 200. This enables the UE 400 to detect initial transmissions of three transport blocks, TB1, TB2 and TB3 at time slots 444, 446 and 448. The respective further transmissions are indicated by the TRIV value in the SCIs received at time slots 444, 446 and 448, and within the SSW 416, the UE 400, in addition to the initial transmissions of TB1, TB2 and TB3, also receives at time slot 450 a second transmission of TB1 as well as at time slot 452 a second transmission of TB2. Using the TRIVs signaled via the respective SCIs for the TBs, the UE 400 is capable to determine the further resources 454 to 460 where further upcoming transmissions or retransmissions may occur.

In accordance with embodiments, to increase the power saving of the UE, instead of carrying out sensing for all the time slots in the reservation window 200, the SSW 416 may be reduced, as is shown in FIG. 8, dependent on a detection desired rate at the UE. The detection rate is defined as the percentage or ratio of transmissions where the UE receives SCIs and carries out sensing, and where a future transmission is indicated in the received SCI, to all transmissions carried out during the reservation window or within the set of resources of the sidelink pool over a configured or preconfigured period of time. For example, the actual length of the SSW 416 may be based on the characteristic of the TRIV formula, which enables the UE to detect receptions based on a duration in which it carries out sensing, and FIG. 9 illustrates a graph showing the detection rate versus the actual sensing duration. The detection rate is calculated over a reservation window of 32 time slots, where the SSW size is varied. It shows the percentage of reservations carried out by UEs, of all possible TRIVs available, that may be detected with a certain SSW size, varying from 1 to 32.

As may be seen from FIG. 9, a UE may carry out sensing for only 15 time slots and still achieve a detection rate of about 75%. For example, in case a UE intends to carry out a transmission in a certain time slot n, during one or more reservation windows preceding the time slot n, the UE received transmissions from other UEs but carries out sensing by decoding the received SCIs. However, the sensing is not performed over entire the reservation windows, as is conventionally done, rather, in accordance with the inventive approach, the SSW 416 having a duration of only 15 time slots is applied so that the UE performs sensing for the previous n−15 to n−1 time slots and still achieves a detection rate of around 75%.

In other words, in accordance with the present invention, a sensing is carried out by the UE only for a portion of the reservation window, depending on the desired accuracy of the sensing result that the UE requires. The accuracy of the sensing result or the detection rate may be varied by the UE dependent on the priority of a transmission for which the UE carries out the sensing. For example, the UE may set the detection rate to 90% for high priority transmissions, and to 60% for low priority transmissions. In case the periodic reservation is used, the UE may repeat the use of the so defined SSW for every reservation window, for example every 32 time slots.

FIG. 10 to FIG. 12 illustrate examples of different detection rates a UE may achieve using varying window sizes. In the figures, the overall numbers of transmission occurrences is indicated by the respective dots, and the graph illustrates for different TRIV values and associated t1 and t2 values the detected and non-detected transmission occurrences 462, 464 within a certain SSW. In FIG. 10 a SSW having a size of 15 time slots is assumed, and the actually detected transmission occurrences 462 using this SSW are indicated, as well as the non-detected transmission occurrences 464 yielding a detection rate of about 75%. In FIG. 11 a SSW having a size of 17 time slots is assumed yielding a detection rate of about 79%, and in FIG. 12 a SSW having a size of 20 time slots is assumed yielding a detection rate of about 87%.

In accordance with further embodiments, a size of the SSW may be adjusted based on a minimum time duration between transmissions indicated by the TRIV, i.e., TRIV values may be employed that yield values of t1 and t2 having at least a certain, predefined duration between the transmissions, like between the first transmission and a further transmission and/or between the further transmissions. In accordance with such embodiments, the confidence level of the inventive partial sensing scheme may be increased by restricting the time duration between the initial transmission and the following further transmissions to be more than a particular value. By restricting the values of t1 and t2, transmitting UEs are restricted to select only a subset of possible TRIV values. In accordance with embodiments a minimum time duration between the initial transmission and the first transmission as well as between the first and second transmission may be defined in a global manner. For example, the minimum time duration may be defined in a resource pool configuration and is provided to all UEs using the resource pool, for example via SIB or RRC configuration. This permits any transmitting UE from using only those TRIV values that comply with the minimum time duration between consecutive transmissions, which are indicated in the SCI.

The minimum time duration enables all UEs using the resource pool to only use a restricted subset of the TRIV values which results in an increase in the detection rate of UEs when using the inventive SSW with even smaller sizes when compared to the above embodiments.

FIG. 13 to FIG. 15 illustrate examples of using TRIV values yielding t1 and t2 values including at least a minimum time duration between the transmissions. FIG. 13 to FIG. 15 illustrate on the left-hand side the ratio of detected/non-detected transmission occurrences 462, 464, as in FIG. 10 to FIG. 12, and on the right-hand side a graph indicating the detection rate verses the SSW size. From the respective graphs it may be seen that only TRIV values are selected for which the t1 and t2 values indicate a duration between transmissions to be above a certain minimum time duration. In FIG. 13, when assuming a minimum time duration of three time slots and a SSW size of 17 time slots, a detection rate of 80% may be achieved. In FIG. 14, when assuming a minimum time duration of five time slots and a SSW size of 17 time slots, the detection rate increases to 81%. In FIG. 15, when assuming a minimum time duration to nine time slots and a SSW size of 17 time slots, the detection rate raises to 85%. In other words, in FIG. 13, the minimum duration between two transmissions is either 3 time slots, 4 time slots or more, and in FIG. 14 it is 5 time slots, 6 time slots or more, and in FIG. 9 it is 9 time slots, 10 time slots or more, as is also illustrated in the graphs showing at the beginning the straight horizontal section and the increase only starts once the minimum duration is achieved.

FIG. 16 illustrates an example for an optimum restriction of the SSW in accordance with which the minimum time duration between transmissions is set to five time slots with a SSW duration of 20 time slots. In such a scenario, the UE is able to achieve a detection rate of 92%.

In accordance with embodiments of the present invention, the SSW or SLW may be defined globally for the entire system, for example by a network entity, like a base station, or it may be configured dynamically by an individual UE before performing a transmission.

When defining or configuring the SSW globally, it may be defined per resource pool or per TX/RX resource pool, for example for UEs operating in Mode 2. In other words, when applying a global approach, the UEs may be preconfigured by the system with a SSW having a certain duration being less than the duration of the reservation window as discussed above. For example, in case the UE intends to transmit in a time slot n, the UE may carry out sensing in a SSW having a length duration_of_subset. The duration_of_subset may refer to time slots where the UE is carrying out sensing and m is a gap between the sensing and the transmission at time slot n, with m≥0. For example, m may be used for the resource selection and processing, like standard PHY and MAC signal processing including, e.g., channel coding, physical layer mapping, etc. Thus, sensing may be performed from slot n-duration_of_subset-m to slot n-m-1. The gap or time gap may be useful when a processing time or a turn-around time required to switch from RX to TX in the UE needs to be considered. The SSW may be defined by the one or more of the parameters mentioned above when describing the embodiment of FIG. 5(a).

In accordance with the inventive approach, a UE may make use of the SSW to allow for a reliable sensing while at the same time operating in a power efficient way. For example, the UE may carry out the reduced sensing using the SSW on one or more of the following occasions:

when the UE is to transmit blind retransmissions,
when the UE is to reduce power consumption, e.g. save battery life,
when the UE is configured or preconfigured to do so, e.g. by another UE or a gNB or the network,
when the UE is configured or preconfigured to use or cater to only a certain service type, e.g. PPDR services or pedestrian services.

However, there may be situations in which the UE may decide that the SSW needs to be adapted or needs to be disabled or turned off. For example, the UE may adapt the SSW window or may disable the SSW based on one or more of the following criteria:

when the UE is to carry out sensing for a transmission having a priority higher than a configured or preconfigured threshold,
when the UE is to transmit using HARQ retransmissions,
when a congestion status of a resource pool is at or above or below a configured or preconfigured threshold,
depending on the UE power status, e.g., a UE which has a small battery pack may always use the SSW, while other UEs may use the SSW only once they are running low on power, like the battery status going below a configured or pre-configured power level,
depending on whether the UE has data to send, e.g. when a buffer status is above a certain threshold.

In accordance with embodiments, for adapting the SSW, the UE may increase or decrease the duration of the SSW. In accordance with embodiments, when disabling the SSW, the UE may carry out sensing during the entire reservation window.

For example, when the UE intends to transmit a high priority transmission, for example a priority above a predefined level, the UE may not use the SSW but carries out a complete sensing over the reservation window or increase the SSW so as to determine the best available resources for the high priority transmission. When the UE performs transmissions with HARQ retransmissions, the UE may prefer to avoid or increase the SSW because the UE expects to receive feedback for the transmission it sent, so that the entire reservation window or at least an increased SSW is used to not miss the feedback. When the congestion status of the resource pool is high, i.e., is about a predefined threshold value, the UE may disable the SSW completely or at least increase or extend the SSW because, due to the congested resource pool, the UE is required to sense at more times to determine any available resources.

In accordance with embodiments, when considering a scenario in which the UE dynamically configures the SSW, in case it is determined that the congestion status of the resource pool is high, rather than completely disabling the SSW or increasing the SSW, the UE may switch to the globally defined SSW, if available, and use the globally defined SSW during the high congestion status of the resource pool.

In the following, embodiments of the inventive approach are described, that supplement the UE's functionality and, at the same time, enable the UE to achieve a required low power demand, thereby further optimizing the efficiency achievable with the inventive approach of using a SSW.

In accordance with a first embodiment, assistance information messages, AIMs, may be used. AIMs may be provided by neighboring UEs for assisting a UE and supplementing, for example, missing sensing data when using SSW. An AIM may include sensing data or sensing results, like available and/or non-available resources. For example, the sensing data may include occupied resources, i.e., resources used or reserved by other UEs in the network, and/or unoccupied resources, i.e., resources not used or reserved by other UEs in the network and being available for a transmission by the UE. The UE may use a combination of the sensing results obtained during the SSW as well as the sensing results indicated in the one or more AIMs received from the other or neighboring UEs so as to determine the best available resources for a transmission. In accordance with embodiments, the AIM contains one or more of the following:

sensing data,
available or occupied resources,
the top-m available resources,
a set or subsets of resources that may be used for transmissions with different priorities.

For example, in case a system permits the use of AIMs, the UE may reduce the dynamic SSW duration once an AIM is received. The UE may avoid carrying out sensing over longer durations of time, and conserve power by powering down, if it is capable to receive AIMs that provide sensing results for the resource pool it is operating in. The UE may then build a resource allocation information map from multiple AIMs, indicating the available resources that the UE may use for a possible transmission. Further, when receiving an AIM, the UE may rely more on the sensing results indicated in the AIM. Even in case the SSW is defined globally, for example per resource pool, the duration may be shorter in case there are a number of UEs configured to provide other UEs with a sensing-based AIM. In accordance with embodiments, when employing sensing results provided by the AIMs, it is even possible to reduce the SSW to a single time slot. In accordance with further embodiments, the UE may also prolong or increase the duration of the one or more SSWs or subsets of time resources used for sensing, dependent on the sensing results and/or depending on the number of AIMs it receives or decodes.

When receiving AIMs from a plurality of UEs neighboring the current UE, the UE may be configured to consider one or more AIMs from the UEs having the strongest signal strength, for example only an AIM of the UE with the strongest signal strength may be employed, or AIMs from UEs having the top-m strongest signal strengths among all neighboring UEs providing AIMs. Also a weighted combination of the received AIMs may be considered, or AIMs may be selected based on the communication distance, e.g. using the zone ID send in an SCI.

In accordance with further embodiments, a pre-transmission SSW may be employed to facilitate preemption. FIG. 17 illustrates an embodiment of a pre-transmission SSW used by the UE 400 to facilitate preemption. FIG. 17 is similar to FIG. 6(d) and uses a SSW having a duration of 20 time slots. The UE 400 carries out sensing within the SL-RP using the SSW for determining a resource and for reserving the time slot 470 for carrying out a transmission. Using the sensing information obtained in the SSW, the UE 400 selects a resource within the selection window. This is depicted in FIG. 17 where the UE 400 transmits the SCI 4_1 in the selected resource, with the SCI 4_1 also reserving a resource for a future transmission, which is to take place in the resource 470. Once the SSW terminates and the UE has transmitted the SCI 4_1, the UE may go into a power down mode or sleep mode. Since the UE is not actively sensing at all times, it may be that another UE, for example a UE having a high priority transmission, preempted the reserved resource 470, and that the UE 400 is not aware of the SCI from the other UE since it was not received within the SSW. To address such a scenario, in accordance with embodiments, the UE may carry out sensing for a further SSW 472 before it attempts to transmit in the already reserved resource 470, so as to enable the UE to trigger a resource reselection procedure for the reserved resource in case it is determined that there is already another transmission for which the resource is reserved which has a higher priority than the transmission of the UE. Before transmitting in an already reserved resource, the UE may choose to evacuate the reserved time slot, in case not enough sensing results are available, e.g., in case a number of sensing results is at or below a certain threshold or the UE is not capable to meet a predefined priority condition. In accordance with further examples, not enough or insufficient sensing results may mean that > an overall or accumulated sensing duration is below a configured or preconfigured threshold, or
> a number of time slots used for sensing is below a configured or preconfigured threshold, or
> when measured in number of on-durations of the UE, the time the UE spend in DRX is above a configured or preconfigured threshold.

Such a choice by the UE depends on the priority of the transmission intended for the reserved resource in question. For example, if the UE has a low priority transmission scheduled to be transmitted in the reserved resource, and was not able to carry out sensing on the SSW before it attempts to transmit, or was able to carry out the SSW, but did not obtain adequate sensing results over a duration of time where the UE ascertains that another high priority transmission has pre-empted the said resource, the UE may choose to not transmit and cause a collision with the other high priority transmission.

Further embodiments of the present invention address high priority transmissions within the SSW and complements the previous embodiment. In case the SSW is defined globally, a UE, like UE 400 of FIG. 5(a), intending to transmit high priority transmissions is to ensure that the SCI indicating this transmission is within the defined SSW used by one or more other UEs in the system, like low power UEs.

This ensures that, for example, all low power UEs using the resource pool may receive the SCIs indicating high priority transmissions and may react accordingly. For example, the reservation for a high priority transmission may take place only n slots in advance, and the value n has to be shorter than the duration of the SSW. This allows the UE transmitting the high priority transmission to also transmit the SCI on slot n so that any UE carrying out sensing using the SSW for a low priority transmission becomes aware of the reserved resource and may trigger a reselection.

It is noted that the above embodiment is not limited to UEs applying the SSW, rather, any other UE in the system that does not employ the inventive SSW, e.g., a sufficiently powered UE, like a vehicular UE, but is aware that there are other UEs, like low power UEs employing the SSW, e.g., a globally defined SSW, may operate in the above described way, namely transmit a transmission, like a high priority transmissions, such that the SCI indicating this transmission is received at the one or more other UEs within the defined SSW.

Further embodiments for assisting UEs using the SSW indicate an end of periodic transmissions. The UE receiving an SCI may be aware of the resource reservation period within which the resource as indicated by the TRIV is repeated in regular intervals, as explained above. However, the UE may not be aware of the overall duration, I.e., the duration over which the resources are repeated or the number of times that these resources are repeated at the specified interval. To address this issue, in accordance with embodiments, a counter may be provided that indicates a number of remaining periodic transmissions, or a flag may be provided indicating whether a transmission is a last transmission or not, based on the value $C_{resel}$ indicating the remaining periodic transmission defined in the SCI. For example, when the flag is set to 1, the SCI indicates that the transmission is repeated, and when the flag is set 0, the transmission is the last one for a given $C_{resel}$ value indicating the overall number of periodic transmission. In accordance with embodiments, the indication whether a transmission is a last transmission or not may be provided by a transmitting UE that also makes use of the inventive SSW. However, it is noted that the above embodiment is not limited to UEs applying the SSW, rather, any other UE in the system that does not employ the inventive SSW, e.g., a sufficiently powered UE, like a vehicular UE, but is aware that there are other UEs, like low power UEs employing the SSW may provide the indication whether a transmission is a last transmission or not.

Thus, further embodiments of the present invention provide a UE in a wireless communication network including one or more further UEs which carry out sensing of transmission occurrences using the SSW approach described herein. The UE may transmit one or more transmissions, and each transmission is associated with control information. The control information includes an indication, like the TRIV, of a first time slot at which the UE transmits and of a plurality of further time slots following the first time slot at which the UE transmits. The first time slot and the further time slots are repeated for another transmission after a resource reservation period, and UE signals to one or more of the further UEs an end of the repetition of resource reservation after the resource reservation period using the control information, for example by using the above described counter or flag. Such a transmission where resources are repeatedly reserved periodically over a reservation period is referred to as a periodic transmission.

In accordance with yet further embodiments, it is ensured that at least one of the transmissions indicated in the SCI is within the SSW. For example, in case the SSW is defined globally, one of the additional transmission occurrences are, for example, one of the up to two additional transmission occurrences, is mandated to lie within the SSW so any UEs using the SSW may listen to it. In accordance with embodiments, the transmitting UE may be a UE using the inventive SSW. However, it is noted that the above embodiment is not limited to UEs applying the SSW, rather, any other UE in the system that does not employ the inventive SSW, e.g., a sufficiently powered UE, like a vehicular UE, but is aware that there are other UEs, like low power UEs employing the SSW, may transmit in the described way.

Thus, further embodiments of the present invention provide a UE in a wireless communication network including one or more further UEs which carry out sensing of transmission occurrences using the SSW approach described herein. The UE may transmit one or more transmissions, and each transmission is associated with control information. The UE transmits such that a first time slot and/or at least one of a plurality of further time slots following the first time slot at which the UE transmits, which are indicated in the control information, falls within the SSW used by one or more of the further UEs. In accordance with embodiments, the UE may transmit such that the first time slot and/or at least one of the further time slots indicated in the control information falls within the SSW, unless one or more of the following exceptions apply:

the transmission to be transmitted has a priority at or above a predefined threshold, the transmission to be transmitted has a latency at or below a predefined threshold, the transmission to be transmitted is a blind retransmission, there are less than two further time slots.

General

Although the respective aspects and embodiments of the inventive approach have been described separately, it is noted that each of the aspects/embodiments may be implemented independent from the other, or some or all of the aspects/embodiments may be combined. Moreover, the subsequently described embodiments may be used for each of the aspects/embodiments described so far.

Although some of the embodiments above are described with reference to a Mode 2 UE, it is noted that the present invention is not limited to such embodiments. The teachings of the present invention as descried herein are equally applicable to Mode 1 UEs carrying out sensing to obtain, e.g., a sensing report for providing an occupancy status of one or more resources or resource sets.

Although some of the embodiments above are described with reference to a sidelink pool, it is noted that the present invention is not limited to such embodiments. Rather, the inventive approach may be implemented in a system or network providing a set or resources to be used for a certain communication between UEs in the network, and the above described subset of time resources or SSW according to the present invention has a number of time resources that is less than the total number of resources within the set of resources. The time resource may be a number of time slots, subframe, radioframes, radio resources in time, a number of PRBs in time domain, also spanning a frequency, subchannel, BWP, etc.

The set of resources may be preconfigured so that the entities of the network are aware of the set of resources provided by the network, or the entities may be configured by the network with the set of resources.

Thus, the set of resources provided by the network may be defined as one or more of the following:

a sidelink resource pool, to be used by the UE for sidelink communications, e.g. direct UE-to-UE communication via PC5, a configured grant including or consisting of resources to be used by the UE for NR-U communications, a configured grant including or consisting of resources to be used a reduced capability UE.

In accordance with embodiments, the set or resources may include one or more sensing regions, e.g., regions per resource pool or per TX/RX resource pool for Mode 1 and/or Mode 2 UEs. A UE may be configured or preconfigured with the one or more sensing regions by the wireless communication network, and the one or more subsets are defined within the one or more sensing regions. For example, a sensing region may span a certain time interval.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments of the present invention, a network entity comprises one or more of the following: a macro cell base station, or a small cell base station, or a central unit of a base station, or a distributed unit of a base station, or a road side unit (RSU), or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 18 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory, RAM, and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein are apparent to others skilled in the art. It is the intent, therefore, to be limited only by the scope of the impending patent claims and not by the specific details presented by way of description and explanation of the embodiments herein.

The invention claimed is:

1. A user device comprising:
a processor circuit; and
a memory circuit,
    wherein the memory circuit is arranged to store instructions,
    wherein the instruction are executable by the processor circuit,
  wherein the processor circuit is arranged to sense on at least one portion of time resources during at least one short sensing window,
  wherein the at least one short sensing window is a portion of a plurality of resources,
  wherein the plurality of resources are provided by the network,
  wherein the processor circuit is arranged to sense by decoding control information,
  wherein the processor circuit is arranged to determine transmission occurrences outside the at least one short sensing window using the control information received during the at least one short sensing window,

wherein the processor circuit is arranged to sense by decoding a first portion of the control information, or a first portion and a second portion of the control information, wherein the at least one short sensing window has a short sensing window duration, wherein the control information indicates a reservation of future resources within a reservation window, wherein the reservation of future resources has a reservations duration, wherein the reservation duration is longer than the short sensing window duration the reservation window having a number of time resources larger than a number of time resources of the at least one short sensing window.

2. A user device comprising:
a processor circuit; and
a memory circuit,
   wherein the memory circuit is arranged to store instructions,
   wherein the instruction are executable by the processor circuit,
wherein the processor circuit is arranged to sense on at least one portion of time resources during at least one short sensing window,
wherein the at least one short sensing window is a portion of a plurality of resources,
wherein the plurality of resources are provided by the network,
wherein the processor circuit is arranged to sense by decoding control information,
wherein the processor circuit is arranged to determine transmission occurrences outside the at least one short sensing window using the control information received during the at least one short sensing window,
wherein the control information comprises:
   an indication of a plurality of second time slots, wherein the plurality of second time slots follow a first time slot; and
   an indication of a plurality of frequency resources,
wherein the first time slot and/or at least a portion of the plurality of second time slots occur during the at least one short sensing window.

3. The user device, of claim 2, wherein a time duration between the first time slot and at least one of the plurality of second time slots is equal to or greater than a value.

4. The user device of claim 2,
wherein, in case the first time slot and the plurality of second time slots are repeated after a resource reservation period,
wherein the user device determines an end of the repetition base one a counter and/or, a flag,
wherein the counter indicated the number of remaining periodic transmissions,
wherein the flag indicates whether a transmission is a last transmission or not.

5. A user device comprising:
a processor circuit; and
a memory circuit,
   wherein the memory circuit is arranged to store instructions,
   wherein the instruction are executable by the processor circuit,
wherein the processor circuit is arranged to sense on at least one portion of time resources during at least one short sensing window,
wherein the at least one short sensing window is a portion of a plurality of resources,

wherein the plurality of resources are provided by the network,
wherein the at least one short sensing window are defined as a pattern across time using at least one of:
the portion of the plurality of set of resources where sensing occurs;
the portion time slots of the plurality of resources where sensing does not occur;
a temporal gap between two consecutive at least one short sensing window a periodicity of the pattern; and
a duration, wherein the pattern repeats across the duration.

6. The user device of claim 5,
wherein the pattern is a frequency pattern using at least one of:
a frequency of the plurality of resources where sensing occurs;
a frequency of the plurality of resources where sensing does not occur; and
a frequency gap between two consecutive at least one short sensing window a periodicity of the frequency pattern a frequency band, wherein the pattern repeats across the frequency band.

7. A user device comprising:
a processor circuit; and
a memory circuit,
   wherein the memory circuit is arranged to store instructions,
   wherein the instruction are executable by the processor circuit,
wherein the processor circuit is arranged to sense on at least one portion of time resources during at least one short sensing window,
wherein the at least one short sensing window is a portion of a plurality of resources,
wherein the plurality of resources are provided by the network,
wherein a size of the plurality of resources or the duration of the at least one short sensing window is based on a detection rate,
wherein the detection rate is defined as a ratio of transmission occurrences during the at least one short sensing window time resources of the one or more subsets to transmission occurrences on all of the plurality of resources over a period of time.

8. The user device of claim 7,
wherein the processor circuit is arranged to sense so as to obtain resources available for a transmission, the detection rate for a transmission having a first priority is higher than the detection rate for a transmission having a second priority,
wherein second priority is lower than the first priority.

9. A user device comprising:
a processor circuit; and
a memory circuit,
   wherein the memory circuit is arranged to store instructions,
   wherein the instruction are executable by the processor circuit,
wherein the processor circuit is arranged to sense on at least one portion of time resources during at least one short sensing window,
wherein the at least one short sensing window is a portion of a plurality of resources,
wherein the plurality of resources are provided by the network, wherein the user device is arranged to configure the at least one short sensing window before a first transmission wherein at least one short sensing window comprises a first short sensing window and a second short sensing window, wherein the user device is arranged to use the first short sensing window prior to transmitting on the second one short sensing window, wherein there is a gap between the first short sensing window and the second short sensing window.

10. A user device comprising:

a processor circuit; and a memory circuit, wherein the memory circuit is arranged to store instructions, wherein the instruction are executable by the processor circuit, wherein the processor circuit is arranged to sense on at least one portion of time resources during at least one short sensing window, wherein the at least one short sensing window is a portion of a plurality of resources, wherein the plurality of resources are provided by the network, wherein the processor circuit is arranged to change or to turn off the at least one short sensing window based on a criteria selected from the group consisting of a transmission has priority higher than threshold, a transmission using HARQ retransmissions, a congestion status of the plurality of set of resources a power status, and/or data read to send.

11. The user device of claim 10, wherein changing the at least one short sensing window comprises increasing or decreasing the duration of the at least on short sensing window.

12. The user device of claim 10, wherein the processor circuit is arranged to sense on all of the plurality of resources when turning of the at least one short sensing window.

13. A user device comprising:

a processor circuit; and a memory circuit, wherein the memory circuit is arranged to store instructions, wherein the instruction are executable by the processor circuit, wherein the processor circuit is arranged to sense on at least one portion of time resources during at least one short sensing window, wherein the at least one short sensing window is a portion of a plurality of resources, wherein the plurality of resources are provided by the network, wherein the user device is arranged to configure the at least one short sensing window before a first transmission, wherein, when the processor circuit is arranged to use a third one of the at least one short sensing window before the first transmission by the user device and when the congestion status of the plurality of resources is at or above a third threshold.

14. A user device comprising:

a processor circuit; and a memory circuit, wherein the memory circuit is arranged to store instructions, wherein the instruction are executable by the processor circuit, wherein the processor circuit is arranged to sense on at least one portion of time resources during at least one short sensing window, wherein the at least one short sensing window is a portion of a plurality of resources, wherein the plurality of resources are provided by the network, wherein the processor circuit is arranged to sense during the at least one short sensing window bases on an event selected from the group consisting of the user device transmitting blind retransmissions, the user device reducing power consumption, the user device is configured by another user device or a gNB or the network, the user device is configured to use a service type.

15. A user device comprising:

a processor circuit; and a memory circuit, wherein the memory circuit is arranged to store instructions, wherein the instruction are executable by the processor circuit, wherein the processor circuit is arranged to sense on at least one portion of time resources during at least one short sensing window, wherein the at least one short sensing window is a portion of a plurality of resources, wherein the plurality of resources are provided by the network, wherein the processor circuit is arranged to receive at least one Assistance Information Message, wherein the at least one Assistance Information Message comprises sensing data, measured power levels and/or a ranking of resources, wherein combination of the sensing results obtained during the at least one short sensing window and the sensing data is used to determine the resources for a transmission by the user device.

16. The user device of claim 15, wherein the at least one Assistance Information Message comprises at least one items from the group consisting of sensing data, available resources, occupied resources, the top-m available resources, at least one resource, wherein the at least one resource is used for transmissions with different priorities.

17. The user device of claim 15, wherein the processor circuit is arranged to reduce the duration of the at least one short sensing window based on the sensing data in the or in response to the reception of the at least one Assistance Information Message.

18. The user device of claim 15, wherein the processor circuit is arranged to increase the duration of the at least one short sensing window based on the sensing data and/or the number of the at least one Assistance Information Message.

19. The user device of claim 15, wherein the processor circuit is arranged to receive a plurality of Assistance Information Messages from a plurality of user devices, wherein the processor circuit is arranged to use the plurality of Assistance Information Messages or a weighted combination of the plurality of Assistance Information Messages or a communication distance to the plurality of second user devices, or the strongest signal strength of the plurality of second user devices or communication distance to the plurality of second user devices.

20. A user device comprising:
a processor circuit; and
a memory circuit,
  wherein the memory circuit is arranged to store instructions,
  wherein the instruction are executable by the processor circuit,
  wherein the processor circuit is arranged to sense on at least one portion of time resources during at least one short sensing window,
  wherein the at least one short sensing window is a portion of a plurality of resources,
  wherein the plurality of resources are provided by the network,
  wherein, in case the processor circuit senses a first transmission at a first time slot before attempting to transmit in the first time slot,
  wherein the processor circuit is arranged to trigger a resource reselection procedure for the first time slot if there are any other transmissions having a priority higher than the attempted transmission in the first time slot.

21. The user device of claim 20, wherein the processor circuit is arranged is to evacuate the future time slot when there is not enough sensing results available during the reselection procedure.

22. A user device comprising:
a processor circuit; and
a memory circuit,
  wherein the memory circuit is arranged to store instructions,
  wherein the instruction are executable by the processor circuit,
  wherein the processor circuit is arranged to sense on at least one portion of time resources during at least one short sensing window,
  wherein the at least one short sensing window is a portion of a plurality of resources,
  wherein the plurality of resources are provided by the network,
  wherein the processor circuit is arranged to transmit a control message within a at least one configured short sensing window is,
  wherein the least one configured short sensing window is configured by the network,
  wherein the processor circuit is arranged is to transmit if the transmit priority is grater that a threshold.

23. A user device network comprising:
a processor circuit; and
a memory circuit,
  wherein the memory circuit is arranged to store instructions,
  wherein the instructions are executable by the processor circuit,
  wherein the user device is a portion of a plurality of user devices,
  wherein each of the plurality of user devices are arranged to sense transmission occurrences during a plurality of resources,
wherein the processor circuit is arranged to transmit periodically using the plurality of resources, wherein the processor circuit is arranged to indicate to at least one of the plurality of user devices, wherein the indication is sent essentially at the end of the periodic transmissions.

24. The user device of claim 23,
wherein each transmission is associated with a control information,
wherein the control information comprises an indication of a first time slot and a plurality of second time slots,
wherein the first time is used by the processor device for transmission,
wherein the plurality of second time slots follow the first time slot.

25. The user device of claim 23,
wherein the processor circuit is arranged to send to at least one of the plurality of the user devices an end of a repetition of a resource reservation,
wherein the end or repetition of the resource reservation is sent after the resource reservation period using the control information.

26. The user device of claim 23,
wherein the processor circuit is arranged to indicate an end of the periodic transmissions using an indication selected from the group consisting of a counter and/or a flag, wherein the counter indicated the number of remaining periodic transmissions,
wherein the flag indicates whether a transmission is a last transmission or not.

27. The user device of claim 23, wherein the plurality of resources provided by the network comprises at least one of a sidelink resource pool, a first configured grant, wherein the first configured grant comprises resources for NR-U communications, a second configured grant, wherein the second configured grant comprises resources for a reduced capability user device.

28. The user device of claim 23, wherein the user device comprises at least one of power limiting, a hand-held size, compatibility with a campus network, an arrangement to carry out repetitive tasks and requiring input from a gateway node at periodic intervals, a mobile terminal, a stationary terminal, a cellular IoT-UE, a vehicular user device, a vehicular group leader device user device, an IoT or narrowband IoT, NB-IoT, device, a moving base station, a road side unit, communication using the network.

29. A user device comprising:
a processor circuit; and
a memory circuit,
  wherein the memory circuit is arranged to store instructions,
  wherein the instruction are executable by the processor circuit,
  wherein the processor circuit is arranged to sense on at least one portion of time resources during at least one short sensing window,
  wherein the at least one short sensing window is a portion of a plurality of resources,
  wherein the plurality of resources are provided by the network,
  wherein the processor circuit is arranged to transmit such that the first time slot and/or at least one of the plurality of second time slots indicated in the control information falls within a range, unless an exception selected from the group consisting of the transmission having a priority at or above a priority threshold, the transmission has a latency at or below a latency threshold, the transmission is a blind retransmission, the plurality of second time slots is less than two, occurs.

30. A method comprising:

periodically transmitting from a first user device using a plurality of resources; and indicating to at least one of a plurality of second user devices the end of the periodic transmissions, wherein each of the plurality of second user devices sense at least on transmission.

31. A computer program stored on a non-transitory medium, wherein the computer program when executed on a processor performs the method as claimed in claim 30.

32. A method comprising:

decoding control information; and transmitting using resources of the plurality of resources such that a first time slot and/or at least one of a plurality of time slots indicated in the control information falls within a range.

33. A computer program stored on a non-transitory medium, wherein the computer program when executed on a processor performs the method as claimed in claim 32.

* * * * *